(12) United States Patent
Iwakami et al.

(10) Patent No.: US 8,505,668 B2
(45) Date of Patent: Aug. 13, 2013

(54) ELECTRIC TWO/THREE-WHEELED VEHICLE

(75) Inventors: Hiroshi Iwakami, Wako (JP); Kaori Goto, Wako (JP); Yusaku Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/496,124

(22) PCT Filed: Sep. 15, 2009

(86) PCT No.: PCT/JP2009/066070
§ 371 (c)(1),
(2), (4) Date: Apr. 2, 2012

(87) PCT Pub. No.: WO2011/033605
PCT Pub. Date: Mar. 24, 2011

(65) Prior Publication Data
US 2012/0175178 A1 Jul. 12, 2012

(51) Int. Cl.
*B60K 11/06* (2006.01)
*B60K 11/08* (2006.01)
*B62D 61/02* (2006.01)
*B62D 61/08* (2006.01)
*B62K 11/00* (2006.01)

(52) U.S. Cl.
USPC ........... 180/220; 180/229; 180/216; 180/211; 180/215

(58) Field of Classification Search
USPC ................ 180/220, 229, 216, 210, 211, 215, 180/217, 218, 219, 65.1, 68.5
See application file for complete search history.

(56) References Cited

U.S. PATENT DOCUMENTS

| 4,519,473 A * | 5/1985 | Ochiai et al. ................... 180/229 |
| 4,557,345 A * | 12/1985 | Hamane et al. ............... 180/229 |
| 4,564,081 A * | 1/1986 | Hamane et al. ............... 180/229 |
| 4,799,568 A * | 1/1989 | Tanaka .......................... 180/219 |
| 6,578,653 B2 * | 6/2003 | Nagai ........................... 180/230 |
| 6,722,460 B2 * | 4/2004 | Yang et al. .................... 180/220 |
| 2002/0162693 A1 * | 11/2002 | Mizuno et al. ............... 180/65.1 |
| 2008/0156557 A1 | 7/2008 | Okamoto |

FOREIGN PATENT DOCUMENTS

| JP | 11-7928 A | 1/1999 |
| JP | 2003-2273 A | 1/2003 |
| JP | 2008-162514 A | 7/2008 |
| WO | WO 2004/069638 A1 | 8/2004 |

* cited by examiner

*Primary Examiner* — Faye M Fleming
*Assistant Examiner* — Keith Frisby
(74) *Attorney, Agent, or Firm* — Birch, Stewart, Kolasch & Birch, LLP

(57) ABSTRACT

An electric two/three-wheeled vehicle includes: a battery case which houses a battery supplying electric power to an electric motor; a leg shield which covers, from a front, legs of a rider sitting on a riding seat; a cooling air inlet duct which has a downstream end portion thereof connected to the battery case; and a cooling fan which introduces cooling air into the battery case through the cooling air inlet duct. In the electric two/three-wheeled vehicle, an opening (90) open toward a rear of the vehicle is provided in the leg shield (43), and an upstream end of the cooling air inlet duct (88) is connected to the leg shield (43) in such a manner as to continue to the opening (90). Accordingly, it is possible to cool a battery while preventing entry of dust into a battery case as much as possible.

20 Claims, 16 Drawing Sheets

ELECTRIC TWO/THREE-WHEELED VEHICLE

TECHNICAL FIELD

The present invention relates to an electric two/three-wheeled vehicle including: an electric motor which exerts power for driving a driven wheel; a battery which supplies electric power to the electric motor; a battery case which houses the battery; a leg shield which covers, from a front, legs of a rider sitting on a riding seat; a cooling air inlet duct which has a downstream end portion thereof connected to the battery case; and a cooling fan which introduces cooling air into the battery case through the cooling air inlet duct.

BACKGROUND ART

An electric two-wheeled vehicle which runs with a rear wheel thereof driven by an electric motor is known. As such an electric two-wheeled vehicle, a two-wheeled motor vehicle in which a battery is cooled by a cooling fan in order to prevent a temperature rise due to heat accompanying charge and discharge of the battery supplying electric power to the electric motor, has been already known as disclosed in Patent Document 1 and Patent Document 2. The vehicle disclosed in Patent Document 1 is formed so that air taken from the front of the vehicle by fans provided in a front portion and an upper portion of a battery case can be introduced into the battery case. The vehicle disclosed in Patent Document 2 is formed so that cooling air can be introduced into a battery case by the action of an electric fan through an opening located at a lower portion of the battery case.

Patent Document 1: Japanese Patent Application Laid-open No. 2003-002273
Patent Document 2: International Patent Application Publication No. WO 2004/069638

DISCLOSURE OF THE INVENTION

Problems to be Solved by the Invention

In the meantime, when dust and the like blown up from the road surface are introduced into a battery case, a battery cell in the battery case gets dirty, thereby causing an increase in the air path resistance and a reduction in the cooling effect. Accordingly, it is desirable to prevent entry of dust into the battery case as much as possible. However, Patent Document 1 and Patent Document 2 described above disclose no technique for preventing such entry of dust.

The present invention has been carried out in view of these circumstances, and an object thereof is to provide an electric two/three-wheeled vehicle which is capable of cooling a battery while preventing entry of dust into a battery case as much as possible.

Means to Solve the Problems

In order to achieve the above object, according to a first feature of the present invention, there is provided an electric two/three-wheeled vehicle including: an electric motor which exerts power for driving a driven wheel; a battery which supplies electric power to the electric motor; a battery case which houses the battery; a leg shield which covers, from a front, legs of a rider sitting on a riding seat; a cooling air inlet duct which has a downstream end portion thereof connected to the battery case; and a cooling fan which introduces cooling air into the battery case through the cooling air inlet duct, characterized in that an opening that is open toward a rear of the vehicle is provided in the leg shield, and an upstream end of the cooling air inlet duct is connected to the leg shield in such a manner as to continue to the opening.

According to a second feature of the present invention, in addition to the first feature, a depressed portion is formed in the leg shield in such a manner as to be depressed frontward from a rear surface thereof, and has the opening provided in an upper portion thereof, and an air inlet opening which communicates with the opening is formed between a lower portion of the depressed portion and a lower edge of a lid attached to the leg shield to cover the opening.

According to a third feature of the present invention, in addition to the second feature, a first projection which extends long in a vehicle width direction and projects rearwardly is formed in the depressed portion in such a projecting manner as to form a space for air circulation between the depressed portion and the lid.

According to a fourth feature of the present invention, in addition to the third feature, a second projection which extends long in the vehicle width direction and projects frontwardly is formed on an inner surface of the lid in such a projecting manner as to form a space for air circulation between the lid and the depressed portion.

According to a fifth feature of the present invention, in addition to the fourth feature, respective pluralities of the first and second projections are arranged alternately in an up-and-down direction.

According to a sixth feature of the present invention, in addition to the first feature, a filtration member is held between the leg shield and a lid attached to the leg shield, the filtration member forming a purified-air room communicating with the opening between the filtration member and the leg shield and forming a unpurified-air room between the filtration member and the lid, and a plurality of inlet openings are provided to the lid.

According to a seventh feature of the present invention, in addition to any one of the first to sixth features, an axle of a front wheel is arranged forward of the leg shield, and at least a part of the opening is arranged above an upper end of the front wheel as seen in a side view.

According to an eighth feature of the present invention, in addition to any one of the first to seventh features, the electric two/three-wheeled vehicle further comprises: a down frame extending rearwardly and downwardly from a head pipe which supports in a steerable manner a front fork pivotally supporting the front wheel; a pair of left and right under frames extending rearwardly from a lower portion of the down frame; and a pair of left and right rear frames extending rearwardly and upwardly from a rear portion of the under frames. The battery case is arranged between the pair of left and right under frames, and the cooling air inlet duct is arranged in the leg shield in such a manner as to extend along the down frame.

According to a ninth feature of the present invention, in addition to the eighth feature, a pair of left and right cooling air inlet ducts are arranged in such a manner as to sandwich the down frame from opposite sides thereof.

According to a tenth feature of the present invention, in addition to any one of the first to ninth features, the cooling fan whose inlet side is connected to the battery case covered with a vehicle cover and whose discharge opening is open toward one side of the battery case in a width direction, is attached to a rear upper surface of the battery case at a position offset to the other side from a center of the battery case in the width direction.

Here, a high-voltage battery 36 of embodiments corresponds to the battery of the present invention.

Effects of the Invention

According to the first feature of the present invention, cooling air is taken into the battery case through the cooling air inlet duct from the opening which is provided in the leg shield in such a manner as to be open toward the rear of the vehicle. Accordingly, relatively clean air is more likely to be guided into the battery case; therefore, dust and the like are less likely to be accumulated in the air passage. Thus, an increase in the air passage resistance with long-term use can be suppressed.

Further, according to the second feature of the present invention, the opening is provided in the upper portion of the depressed portion, which is formed on the leg shield, and the air inlet opening, which communicates with the opening, is provided between the lower edge of the rid, which covers the opening, and the lower portion of the depressed portion. Accordingly, rain water is less likely to enter the cooling air inlet duct from the opening; therefore, it is possible to suppress an increase in the air passage resistance caused by adhesion of dust due to rain water onto the inner surface of the cooling air inlet duct.

According to the third feature of the present invention, the first projection, which extends long in the vehicle width direction and projects rearwardly, is provided in a projecting manner on the depressed portion. Accordingly, it is possible to drain rain water with use of the first projection and thereby prevent entry of rain water into the cooling air inlet duct more effectively, and it is possible to improve the rigidity of the leg shield with the first projection functioning as a reinforcement rib.

According to the fourth feature of the present invention, the second projection, which extends long in the vehicle width direction and projects frontwardly, is provided in a projecting manner on the inner surface of the lid. Accordingly, it is possible to drain rain water with use of the second projection in addition to the first projection and thereby prevent entry of rain water into the cooling air inlet duct more effectively, and it is possible to improve the rigidity of the lid with the second projection functioning as a reinforcement rib.

According to the fifth feature of the present invention, the respective pluralities of the first and second projections are arranged alternately in the up-and-down direction. Accordingly, it is possible to further effectively prevent entry of rain water into the cooling air inlet duct.

According to the sixth feature of the present invention, air introduced into the unpurified-air room from the inlet opening, which is provided in the lid, can be purified by passing through the filtration member, and thus purified air is introduced into the battery case from the purified-air room through the opening and the cooling air inlet duct. Accordingly, dust and the like are less likely to accumulate in the air passage; thus, it is possible to more effectively prevent an increase in the air passage resistance with long-term use.

According to the seventh feature of the present invention, at least a part of the opening is arranged as seen in a side view above the upper end of the front wheel having its axle arranged forward of the leg shield. Accordingly, the distance from the road surface to the opening is made relatively large; therefore, it is possible not to allow dust blown up from the road surface to enter the opening easily.

According to the eighth feature of the present invention, the battery case is arranged between the pair of left and right under flames which extend rearwardly from the lower portion of the down frame extending rearwardly and downwardly from the head pipe, and the cooling air inlet duct is arranged in the leg shield in such a manner as to extend along the down flame. Accordingly, even in the structure in which the cooling air inlet duct is housed inside the leg shield, the leg shield can be made compact; therefore, it is possible to prevent an increase in the size of the leg shield.

According to the ninth feature of the present invention, the pair of left and right cooling air inlet ducts arranged in such a manner as to sandwich the down frame from both sides thereof are connected to the battery case. Accordingly, it is possible to avoid an increase in the size of the cooling air inlet ducts while securing a sufficient amount of cooling air introduced into the battery case.

Further, according to the tenth feature of the present invention, inside the vehicle cover covering the battery case, the cooling fan having the inlet side connected to the battery case has the discharge port being open toward one side of the width direction of the battery case, and is attached to the rear upper surface of the battery case at a position offset to the other side from the center of the battery case in the width direction. Accordingly, it is possible to reduce the air passage resistance due to rebound of the air discharged from the cooling fan off the vehicle cover.

DESCRIPTION OF REFERENCE NUMERALS AND SYMBOLS

Figure 1:
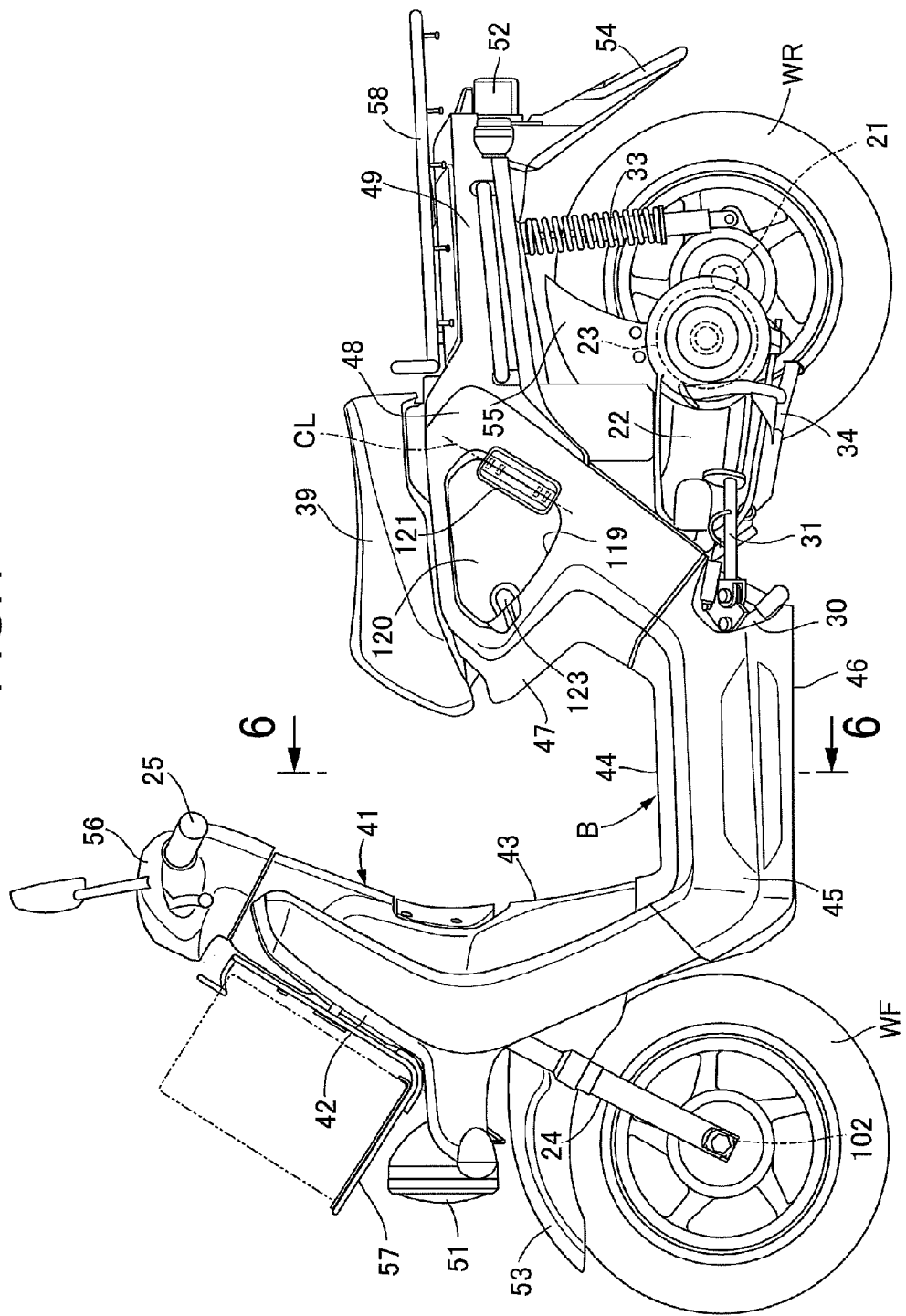
FIG. 1 is a side view of an electric two-wheeled vehicle of Embodiment 1. (Embodiment 1)

23 . . . Electric motor
24 . . . Front fork
26 . . . Head pipe
27 . . . Down frame 28 ... Under frame
29 ... Rear frame
36 ... High-voltage battery serving as a battery
37 ... Battery case
39 ... Riding seat
41 ... Vehicle cover
43, 125 ... Leg shield
88 ... Cooling air inlet duct
90 ... Opening
91 ... Depressed portion
94, 128 ... Lid
97 ... Air inlet opening
98, 99 ... First projection
100, 101 ... Second projection
102 ... Axle
105 ... Cooling fan
106 ... Discharge opening
131 ... Purified-air room
132 ... Unpurified-air room
133 ... Filtration member
134 ... Inlet opening
WF ... Front wheel
WR ... Rear wheel serving as a driven wheel

BEST MODE FOR CARRYING OUT THE INVENTION

Modes for carrying out the preset invention will be described below with reference to the attached drawings.
Embodiment 1
Embodiment 1 of the present invention will be described by referring to FIG. 1 to FIG. 14. Firstly, in FIG. 1, this electric two-wheeled vehicle is a scooter-type electric two-wheeled vehicle having a low deck floor 44, and is formed so that rotative power exerted by an electric motor 23 disposed inside a swing arm 22 pivotally supporting with a rear portion thereof an axle 21 of a rear wheel WR serving as a driven wheel can rotationally drive the rear wheel WR.

Figure 2:
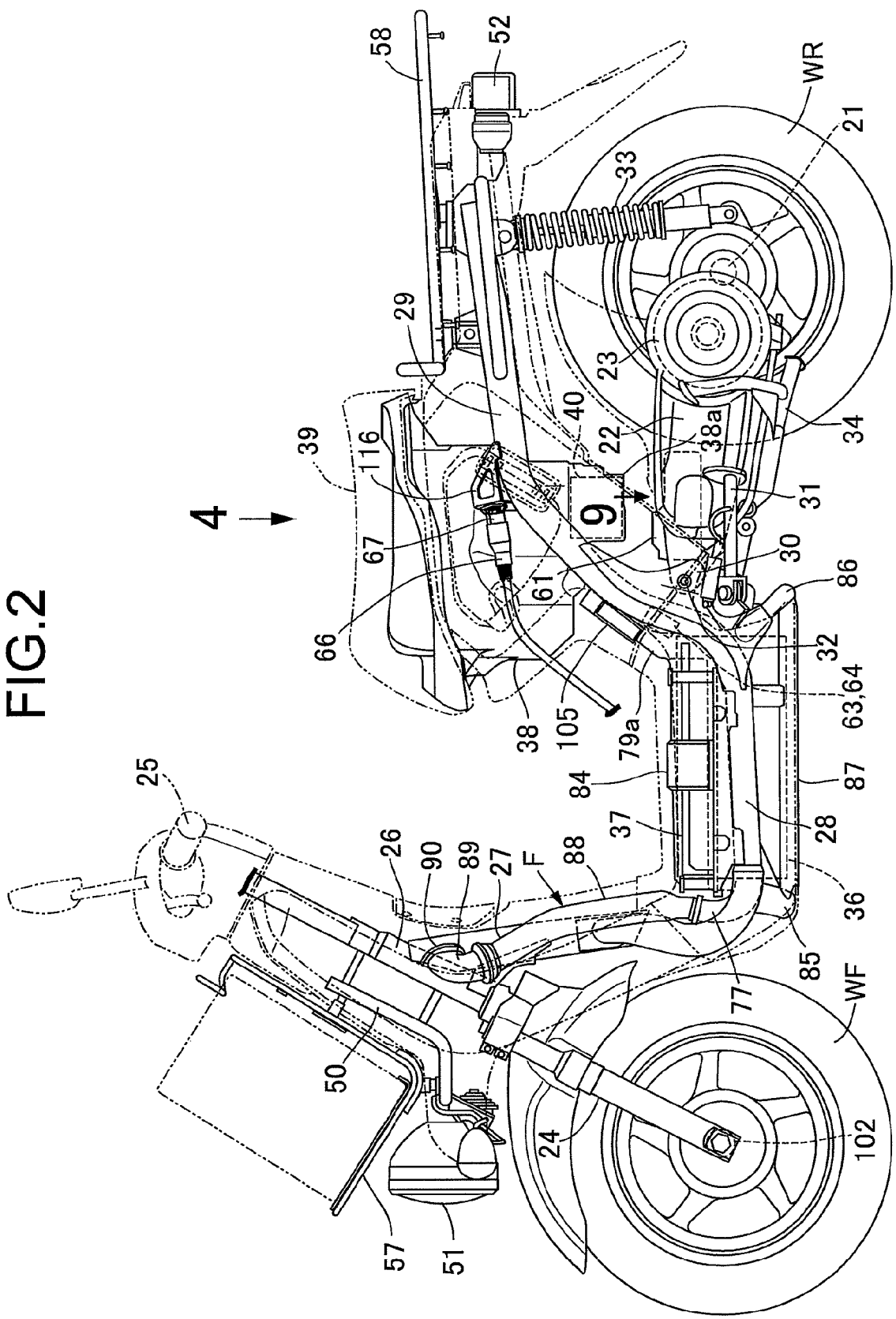
FIG. 2 is a side view of the electric two-wheeled vehicle with a vehicle cover being omitted. (Embodiment 1)

In FIG. 2, a body frame F of this electric two-wheeled vehicle has: a head pipe 26 which supports in a steerable manner a front fork 24 pivotally supporting a front wheel WF and a steering handle 25 connected to an upper portion of the front fork 24; a down frame 27 which extends from the head pipe 26 rearwardly and downwardly; a pair of left and right under flames 28 ... which are connected to a lower portion of the down frame 27 and extend rearwardly; and a pair of left and right rear frames 29 ... which integrally continue to a rear end of these under frames 28 ... and extend rearwardly and upwardly.

To pivot plates 30 ... which are provided in a front portion of both of the rear frames 29 ... of the body frame F, a side stand 31 for maintaining a vehicle body B to be in a standing state with a leftward inclination is attached in a rotatable manner, and a front portion of the swing arm 22 is supported in a swingable manner with a support shaft 32 therebetween. A rear cushion unit 33 is provided between a rear portion of the left rear frame 29 of the left and right rear frames ... 29 and a rear portion of the swing arm 22. Further, a main stand 34 is attached to a front portion of the swing arm 22 in a rotatable manner.

A battery case 37 having therein a high-voltage battery 36 of, for example, 72V, which supplies electric power to the electric motor 23, is arranged between both of the under frames 28 ... in such a manner as to be supported by both of the under frames 28 ... . A storage box 38 which is arranged above the swing arm 22 as seen in a side view is arranged between both of the rear frames 29 ... in such a manner as to be supported by both of the rear frames 29 ... , and this storage box 38 is covered from above by a riding seat 39 which is openable and closable. In addition, at a rear lower portion of the storage box 38, a battery storage part 38a storing a low-voltage battery 40 which supplies electric power at a low voltage of, for example, 12 V, to accessories, such as a front light 51, a tail light 52, and a control unit (not shown in the drawing), is integrally formed in such a manner as to project downwardly.

The body frame F is covered by a vehicle cover 41 made of a synthetic resin, the vehicle cover 41 forming the vehicle body B together with the body frame F. The vehicle cover 41 includes: a front cover 42 which covers the head pipe 26 from the front; a leg shield 43 which continues to the front cover 42 in such a manner as to cover, from the front, legs of a rider sitting on the riding seat 39; a low deck floor 44 which continues to a lower portion of the leg shield 43 so as to allow the legs of the rider sitting on the riding seat 39 to be placed thereon, and covers the battery case 28 from above; a pair of left and right floor side covers 45 ... which are suspended from both sides of the low deck floor 44, respectively, in such a way as to cover both of the under frames 28 ... from both sides; an under cover 46 which connects between lower edges of the respective left and right floor side covers 45; an under-seat front portion cover 47 which arises from a rear end of the low deck floor 44 in such a manner as to cover below the riding seat 39 from the front; a pair of left and right side covers 48 ... which continue to both sides of the under-seat front portion cover 47, respectively, in such a manner as to cover below the riding seat 39 from the both sides; and a rear cover 49 which continues to both of the side covers 48 ... in such a manner as to cover the rear wheel WR from above. The battery case 37 is covered by, of the vehicle cover 41, the low deck floor 44, the floor side covers 45 ... , the under cover 46, the under-seat front portion cover 47, and the side covers 48 ... .

The front light 51 is disposed at a front end of the front cover 42 in such a manner as to be supported by a stay 50 fixed to the head pipe 26, while the tail light 52 is attached to the rear frames 29 ... . A front fender 53 which covers the front wheel WF from above is attached to the front fork 24, a rear fender 54 which covers the rear wheel WR from rearward obliquely above is connected to the rear cover 49, and a fender 55 which covers the rear wheel WR from frontward obliquely above is attached to a front portion of the swing arm 22. A middle portion of the steering handle 25 is covered by a handle cover 56. A front carrier 57 which is arranged in front of the front cover 42 is supported by the stay 50. A rear carrier 58 is arranged behind the riding seat 39 above the rear cover 49 in such a manner as to be supported by the rear frames 29 ... .

Figure 3:
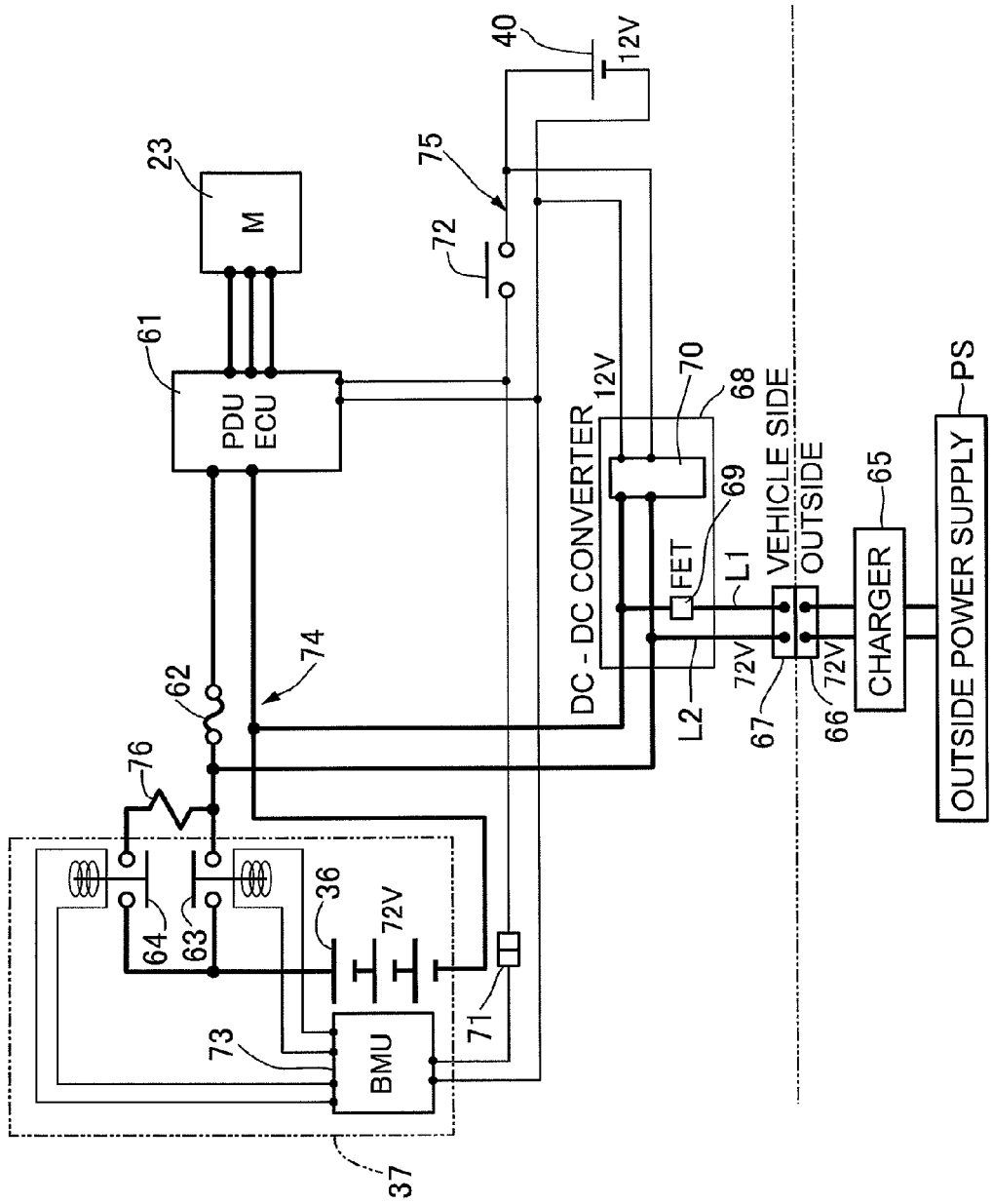
FIG. 3 is a schematic system diagram of an electric system. (Embodiment 1)

In FIG. 3, the electric motor 23 is driven by a power drive unit (PDU) 61 having a control unit installed therein. The power drive unit 61 is connected to a plus-side terminal of the high-voltage battery 36 with a fuse 62 and a first relay switch 63 therebetween. The first relay switch 63 is connected in parallel to a series circuit made up of a second relay switch 64 and a resistor 76. In the meantime, the high-voltage battery 36 and the low-voltage battery 40 can be charged from a charger 65, which is capable of outputting voltage as high as that of the high-voltage battery 36 when connected to an external power supply PS. A receiver-side connector 67 into which a feeder-side connector 66 continuing to the charger 65 connected to the external power supply PS can be inserted for connection is provided to the vehicle side, and the receiver-side connector 67 is connected to a DC-DC converter 68.

Then, the DC-DC converter 68 has a field-effect transistor 69 provided in the middle of one L1 of a pair of lines L1 and L2 which continue to the receiver-side connector 67, and a voltage drop circuit component 70 which is connected to both of the lines L1 and L2 so as to allow the voltage from the charger 65 to drop to a low voltage, for example, of 12 V. Both of the lines L1 and L2 of the DC-DC converter 68 are connected to a plus-side terminal of the high-voltage battery 36 with a parallel circuit made up of a series circuit, which is made up of the second relay switch 64 and the resistor 76, and the first relay switch 63, therebetween so as to supply high-voltage charging current to the high-voltage battery 36. The voltage drop circuit component 70 is connected to a plus-side terminal and a minus-side terminal of the low-voltage battery 40.

The control unit installed in the power drive unit 61 is connected to the plus-side terminal of the low-voltage battery 40 with a main switch 72 therebetween, and is connected to a minus-side terminal of the low-voltage battery 40. Further, on and off of the first and second relay switches 63 and 64 are switched by control current output from a battery managing unit (BMU) 73 with supply of electric power from the low-voltage battery 40. The battery managing unit 73 is connected to a plus-side terminal of the low-voltage battery 40 with the main switch 72 and a connector 71 therebetween, and is also connected to a minus-side terminal of the low-voltage battery 40.

Then, when the main switch 72 is ON, the battery managing unit 73 firstly achieves a conduction state of the second relay switch 64 so as to apply electric current to the power drive unit 61 from the high-voltage battery 36 through the second relay switch 64, the resistor 76, and the fuse 62, and thereafter conducts the first relay switch 63. This prevents welding of the first relay switch 63 due to an inrush current to a capacitor provided inside the power drive unit 61.

In the meantime, circuits between the high-voltage battery 36 and the power drive unit 61 and between the high-voltage battery 36 and the DC-DC converter 68 make up a high-power circuit (a circuit indicated by a thick solid line) 74 which continues to the high-voltage battery 36. A circuit among the low-voltage battery 40, the power drive unit 61, the battery managing unit 73, and the DC-DC converter 68 makes up a low-power circuit (a circuit indicated by a thin solid line) 75 which continues to the low-voltage battery 40. The high-power circuit 74 includes the first relay switch 63, the second relay switch 64, the fuse 62, and the resistor 76 inserted therein, and the low-power circuit 75 includes the connector 71 and the main switch 72 inserted therein.

Incidentally, the first relay switch 63, the second relay switch 64, and the battery managing unit 73 are stored in a battery case 37 storing the high-voltage battery 36.

Figure 4:
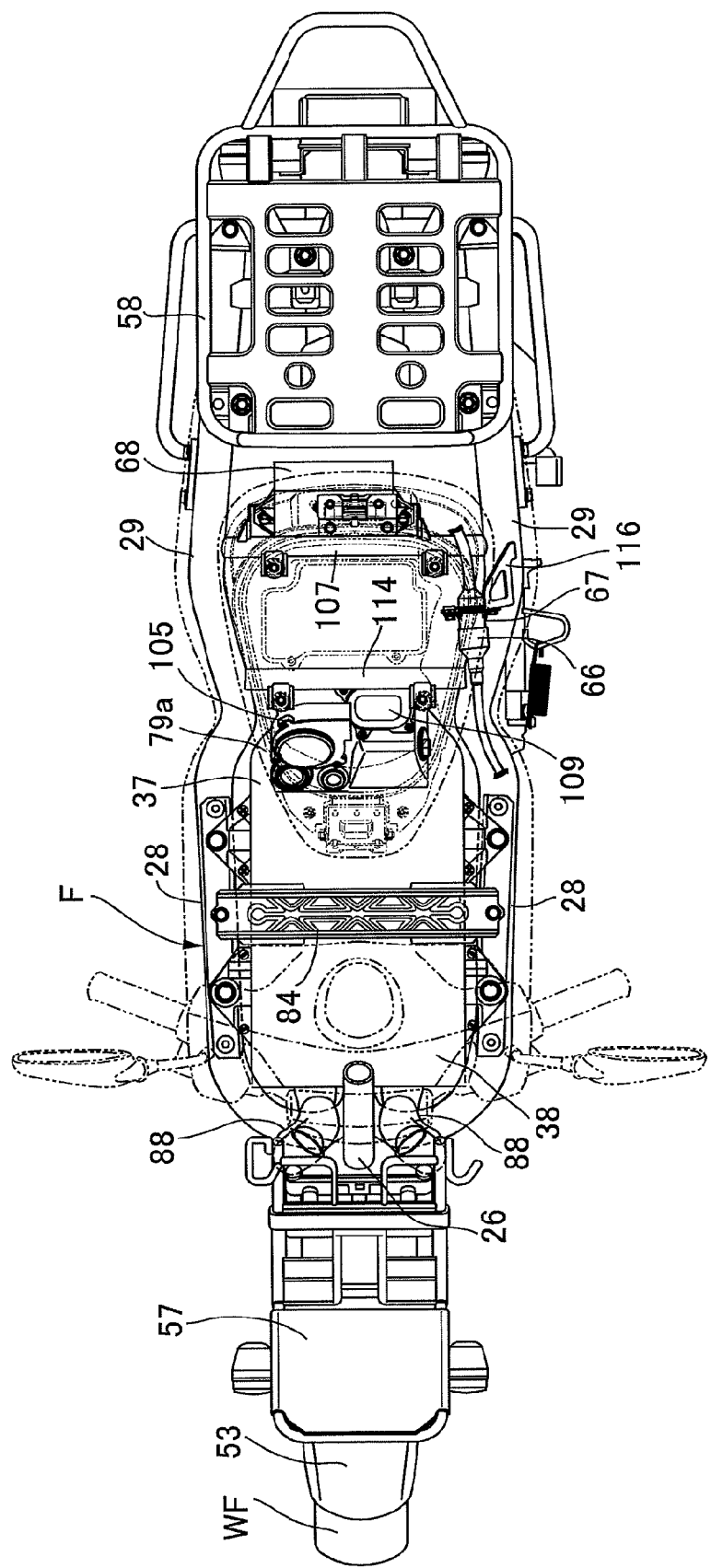
FIG. 4 is a view from a direction of an arrow 4 in FIG. 2. (Embodiment 1)
Figure 5:
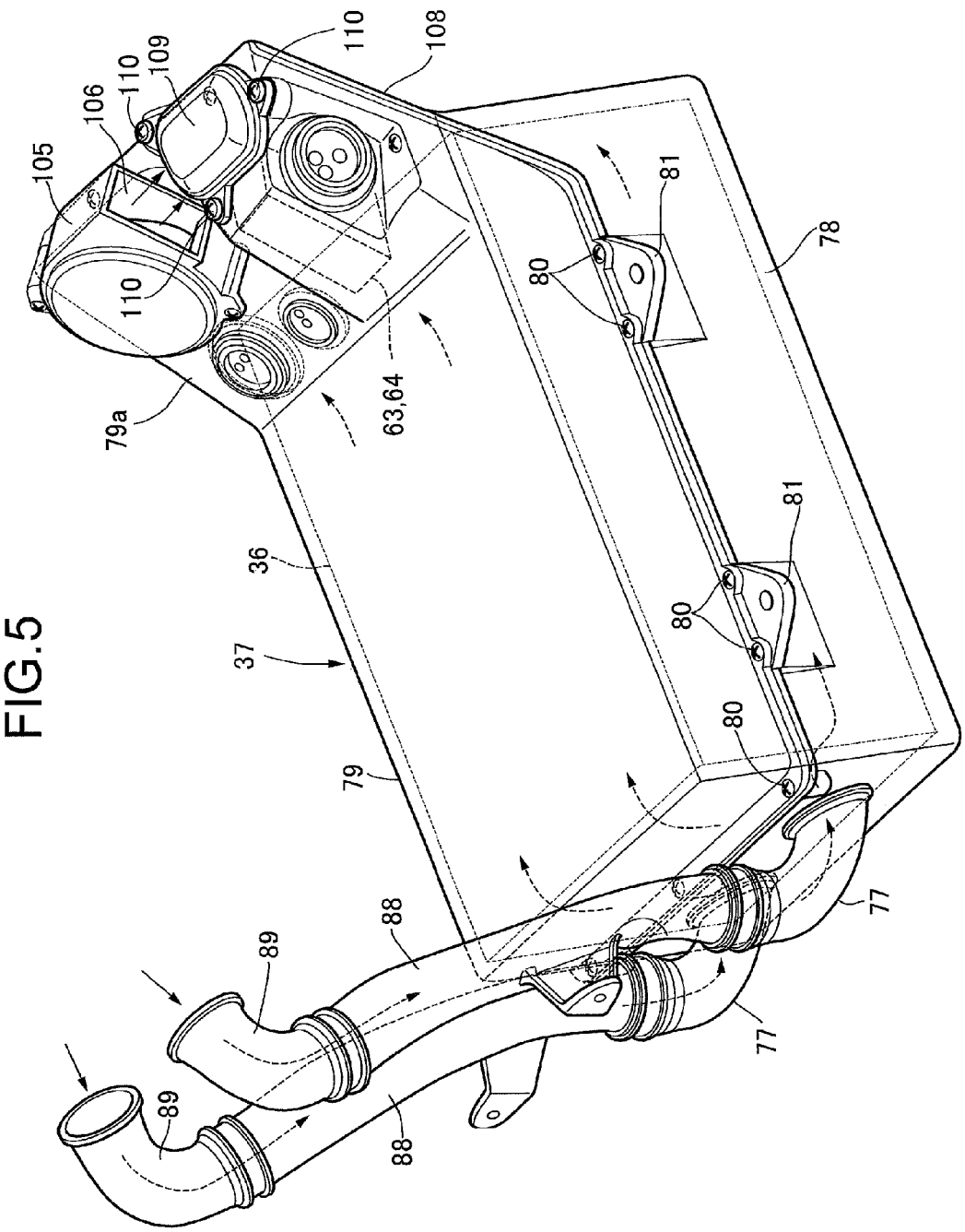
FIG. 5 is a perspective view of a battery box and a cooling air inlet duct. (Embodiment 1)

By referring to FIG. 4 and FIG. 5 together, the battery case 37 is formed with a box-shaped lower case 78, which is open upwardly, and a box-shaped upper case 79, which is open downwardly, being bound to each other with multiple screw members 80, 80 . . . . Multiple support plates 81, 81, . . . which are fixed to respective upper portions of both sides of the lower case 78 as a half body in such a manner as to project sidewardly are bound onto both of the under frames 28 . . . of the body frame F with bolts 82, 82 . . . and weld nuts 83, 83 . . . welded to the under frames 28 . . . ; thereby the battery case 37 is supported by both of the under frames 28 . . . .

A cross member 84 which crosses over a substantially center portion of the battery case 37 in the front and rear direction thereof is provided between both of the under frames 28 . . . , and the low deck floor 44 is supported by the cross member 84. Further, a front portion protective member 85, which protects a front lower portion of the battery case 37 from the front, is provided between front portions of the respective under frames 28 . . . in such a manner as to have its center portion connecting to a lower end of the down frame 27. A rear portion protective member 86, which protects a rear lower portion of the battery case 37 from the rear, is provided between rear portions of the respective left and right under frames 28 . . . . Multiple lower portion protective members 87, 87 . . . each extending in the front and rear direction are provided between the front portion and rear portion protective members 85 and 86 in such a manner as to protect the battery case 37 from the below.

Figure 6:
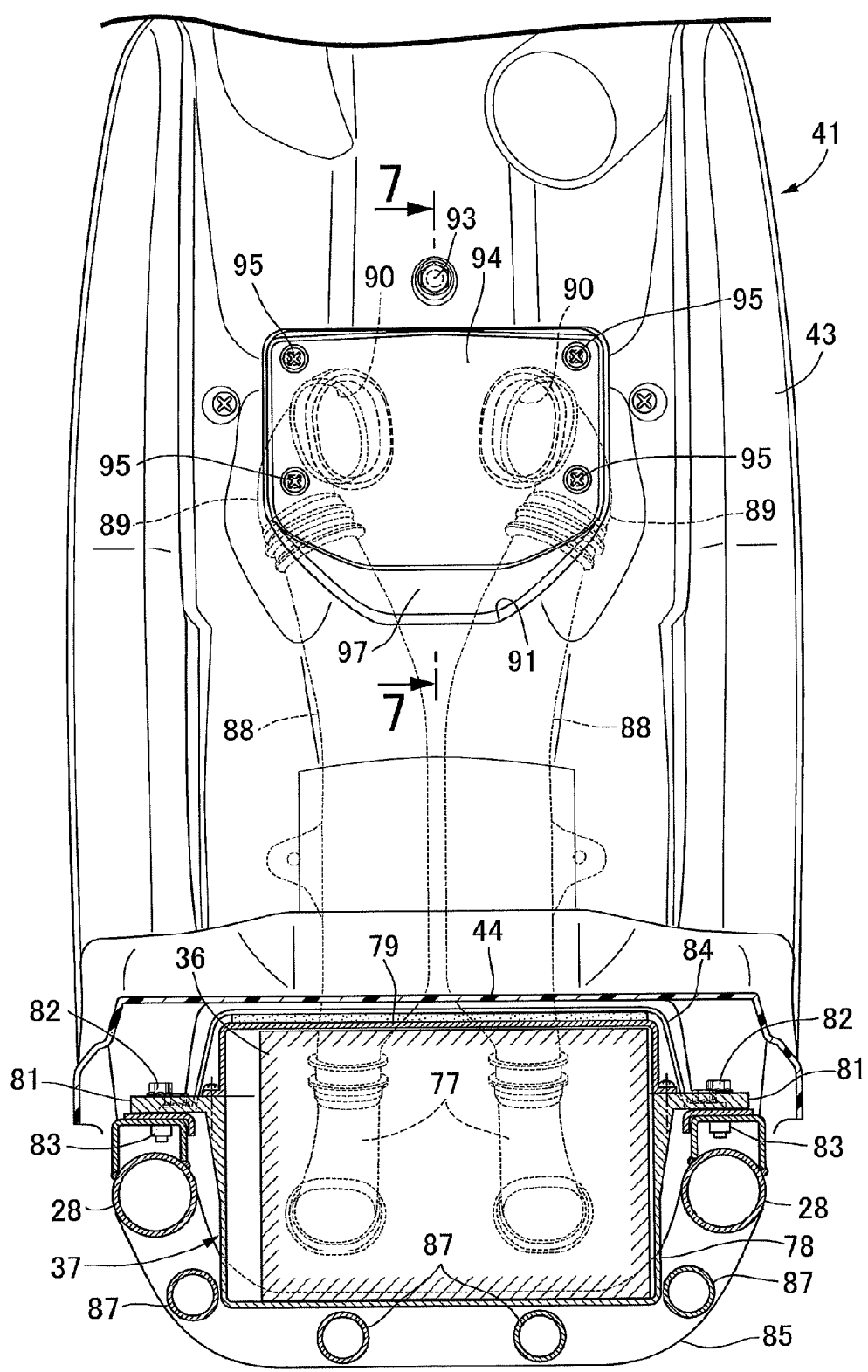
FIG. 6 is a sectional view taken along a line 6-6 in FIG. 1 with an under cover being omitted. (Embodiment 1)
Figure 7:
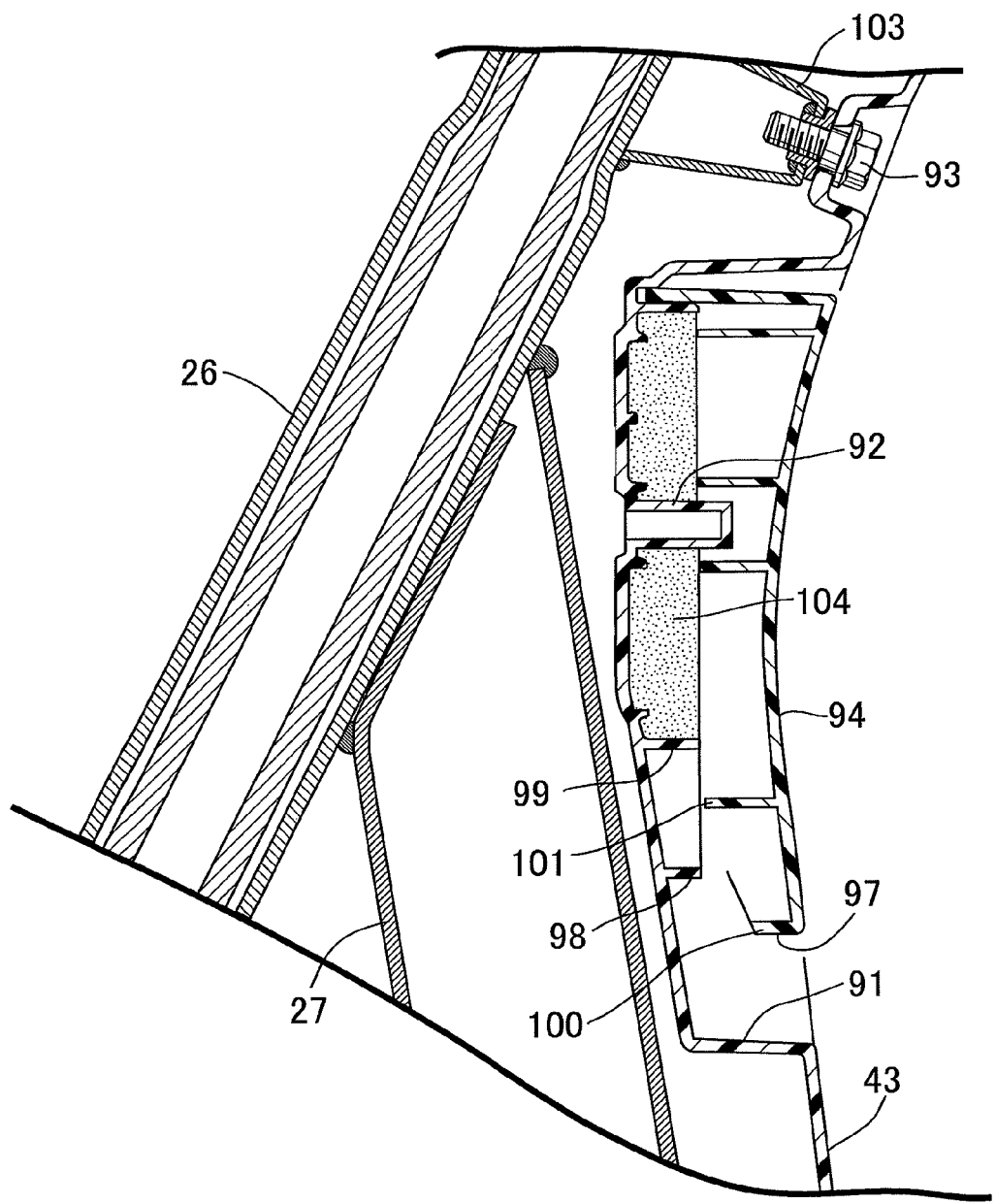
FIG. 7 is an enlarged sectional view taken along a line 7-7 in FIG. 6. (Embodiment 1)
Figure 8:
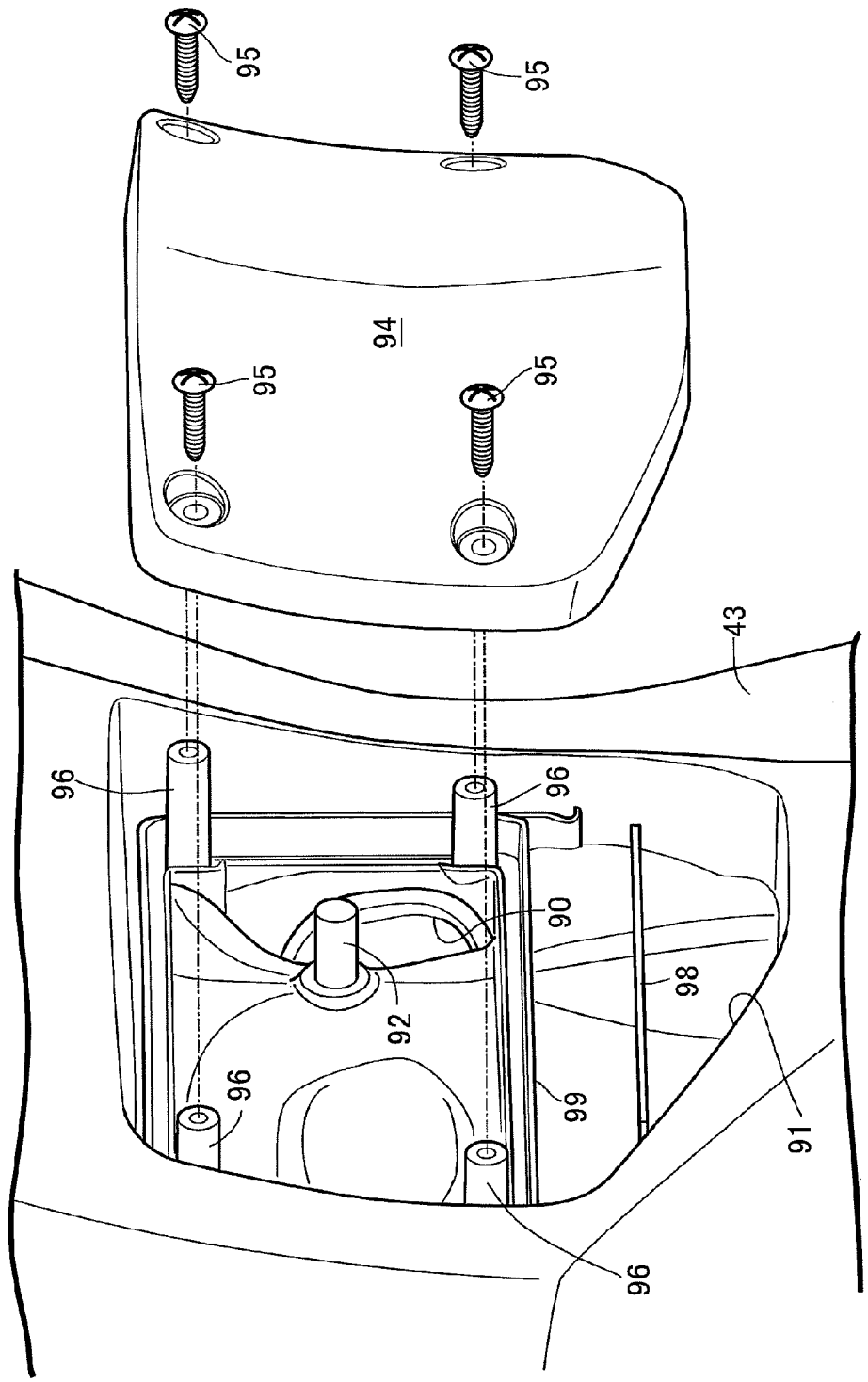
FIG. 8 is an exploded perspective view of a leg shield and a lid. (Embodiment 1)

By referring to FIG. 6 to FIG. 8 together, respective downstream end portions of a pair of left and right cooling air inlet ducts 88 . . . are connected to a front portion of the lower case 78 of the battery case 37 with connecting pipes 77 . . . therebetween. In the meantime, the leg shield 43 is supported to a stay 103 with a bolt 93, the stay 103 being fixed to a rear portion of the head pipe 26. Both of the cooling air inlet ducts 88 . . . which sandwich the down frame 27 from the two opposite sides thereof inside the leg shield 43 are arranged to extend along the down frame 27. Meanwhile, a pair of left and right openings 90, 90, which are open toward the rear of the vehicle, are provided to the leg shield 43 at a position in the down frame 27, the position corresponding to a connecting portion to the head pipe 26. Respective upstream portions of the cooling air inlet ducts 88 . . . are connected to the leg shield 43 with connecting pipes 89 . . . therebetween in such a manner as to continue to the respective openings 90 . . . .

In the meantime, a depressed portion 91 is formed in the leg shield 43 in such a manner as to be depressed frontward from a rear surface thereof. Both of the openings 90 . . . are provided in an upper portion of the depressed portion 91. In addition, a first boss 92 is integrally formed in a projecting manner in the depressed portion 91 at a middle portion between both of the openings 90 . . . in such a manner as to project rearwardly.

Further, a lid 94 which covers both of the openings 90 . . . is attached to the leg shield 43 with multiple screw members 95, 95 . . . . Then, at positions corresponding to respective corner portions of a hypothetical rectangle surrounding both of the openings 90 . . . , second bosses 96, 96 . . . each having a cylindrical shape are integrally provided respectively in a projecting manner to the depressed portion 91. The lid 94 bringing its inner surface in contact with these second bosses 96, 96 . . . is bound to the leg shield 43 with the screw members 95, 95 . . . which are inserted into the lid 94 so as to be screwed with the second bosses 96, 96 . . . .

An air inlet opening 97 which communicates with both of the openings 90 . . . is formed between a lower edge of the lid 94 and a lower portion of the depressed portion 91. Further, at multiple positions, for example, 2 positions, which are apart from each other in the up-and-down direction in the depressed portion 91, first projections 98 and 99 which extend long in the vehicle width direction while projecting rearwardly are provided in a projecting manner so as to form a space for air circulation between the depressed portion 91 and the lid 94. At multiple positions, for example, 2 positions, which are apart from each other in the up-and-down direction on the inner surface of the lid 94, second projections 100 and 101 which extend long in the vehicle direction while projecting frontwardly are provided in a projecting manner so as to form a space for air circulation between the lid 94 and the depressed portion 91. In addition, two pieces each of the first projections 98 and 99 and the second projections 100 and 101 are arranged alternately in the up-and-down direction.

Furthermore, a spongy filtration member 104 is sandwiched between the leg shield 43 and the lid 94 so as to be interposed between the air inlet opening 97 and both of the openings 90 . . . . The positioning of the filtration member 104 is achieved by penetration of the first boss 92 thereinto.

In the meantime, as shown in FIG. 1, an axle 102 of the front wheel WF is arranged frontward of the leg shield 43, and at least a part of both of the openings 90 . . . , which is a front portion of the respective openings 90 . . . in Embodiment 1, is arranged upwardly of an upper end of the front wheel WF as seen in a side view.

Figure 9:
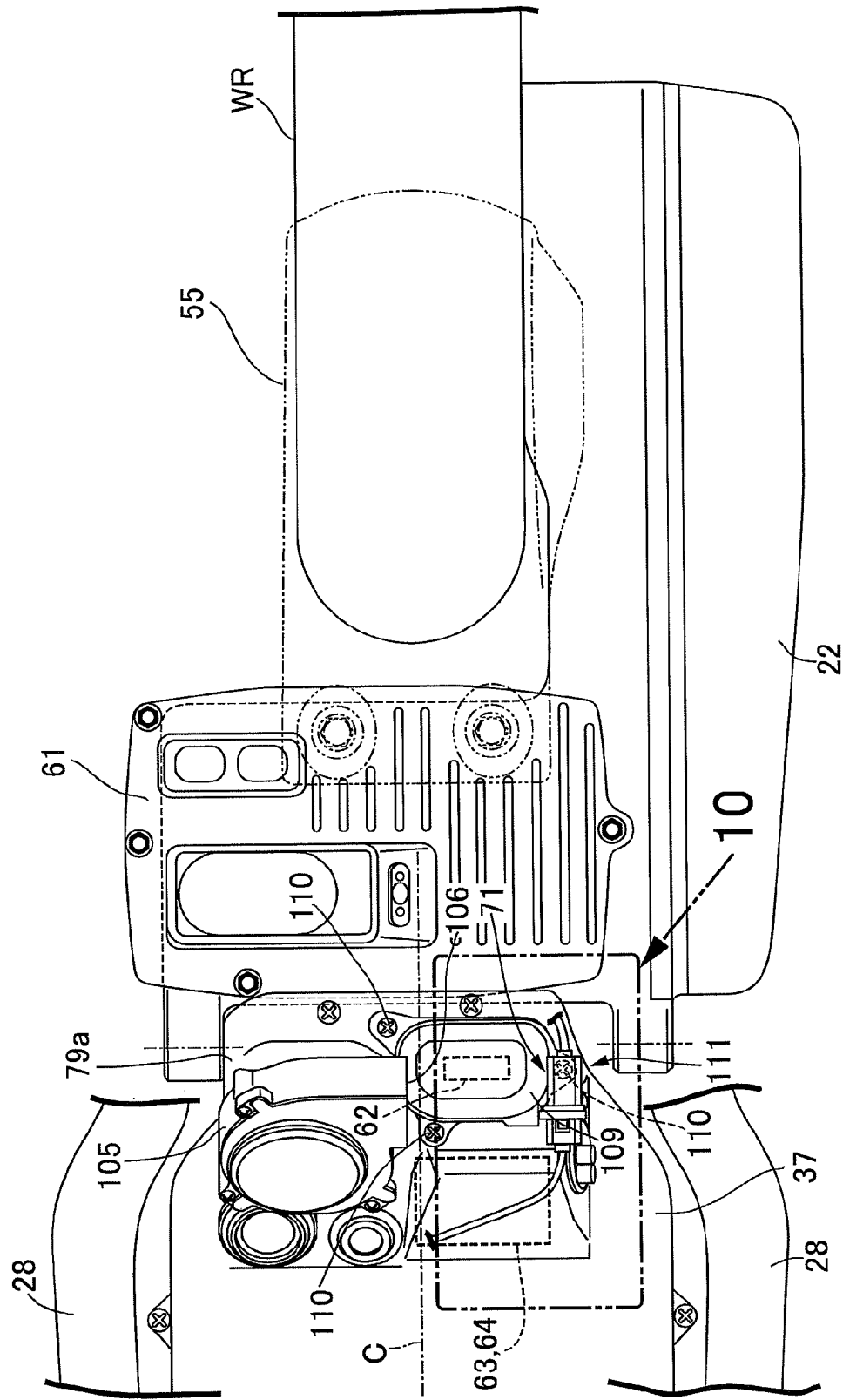
FIG. 9 is a view from a direction of an arrow 9 in FIG. 2. (Embodiment 1)

By referring to FIG. 9 in addition, cooling air is introduced into the battery case 37 by the action of a cooling fan 105 attached to an upper surface of a rising portion 79a provided on a rear upper surface of the battery case 37, which is, in the present embodiment, a rear portion of the upper case 79 constituting a part of the battery case 37. The cooling fan 105 whose inlet side is connected to the rising portion 79a of the battery case 37 and whose discharge opening 106 is open toward one side (the left side in Embodiment 1) of the battery case 37 in the width direction thereof, is attached to the upper surface of the rising portion 79a at a position offset to the other side (the right side in Embodiment 1) from the center C (refer to FIG. 9) of the battery case 37 in the width direction thereof.

Further, the first and second relay switches 63 and 64, which are inserted in the high-power circuit 74, are housed in the rising portion 79a. As a result, the first and second relay switches 63 and 64 are arranged between the high-voltage battery 36 and the low-voltage battery 40 as seen in a side view as shown in FIG. 2.

In the meantime, the power drive unit 61 which is arranged forward of the rear wheel WR is provided in a front portion of the swing arm 22 which houses in a rear portion thereof the electric motor 23 driving the rear wheel WR. Accordingly, the first and second relay switches 63 and 64 which are housed in the rear portion of the battery case 37 are arranged, as seen in a side view, in a region surrounded by the high-voltage battery 36, the low-voltage battery 40, and the power drive unit 61. Further, the DC-DC converter 68 is arranged rearward of the storage box 38 in such a manner as to be supported to a cross member 107 (refer to FIG. 4) which connects between both of the rear frames 29 . . . and thereby supports a rear portion of the storage box 38.

Further, the fuse 62 inserted in the high-power circuit 74 is supported to a relay board 108 and housed between the rising portion 79a and the relay board 108, the relay board 108 being provided in the lower case 78 forming a part of the battery case 37 and covering the rising portion 79a from the behind. A lid member 109 which covers the fuse 62 from above is bound to the rising portion 79a of the upper case 79 with multiple screw members 110 . . . . Moreover, the lid member 109 is arranged at a position offset, in a plan view, to one side (the left side in Embodiment 1) from the center C of the battery case 37 in the width direction thereof.

The connector 71 inserted in the low-power circuit 75 is capable of switching by manual operation conducting and shutting-off of a wire forming a part of the low-power circuit 75 continuing to the low-voltage battery 40. Contact with the fuse 62, which is housed between the rising portion 79a of the battery case 37 and the relay board 108, is permitted by the action of a contact prevention means 111 only in the state where the low-power circuit 75 is shut off by the connector 71.

The contact prevention means 111 is formed so as to permit opening of the lid member 109 covering the fuse 62, which is housed between the rising portion 79a of the battery case 37 and the relay board 108, only in the state where the low-power circuit 75 is shut off by the connector 71, and is formed by arranging the connector 71 in such a manner as to cover at least one of the multiple screw members 110 . . . , with which the lid member 109 is bound to the rising portion 79a of the upper case 79, from the opening side of the lid member 109. Specifically, as a result, the connector 71, which is arranged in a position facing the lid member 109 from the opening side thereof, is arranged so as to permit opening of the lid member 109 in manual shutoff.

Figure 10:
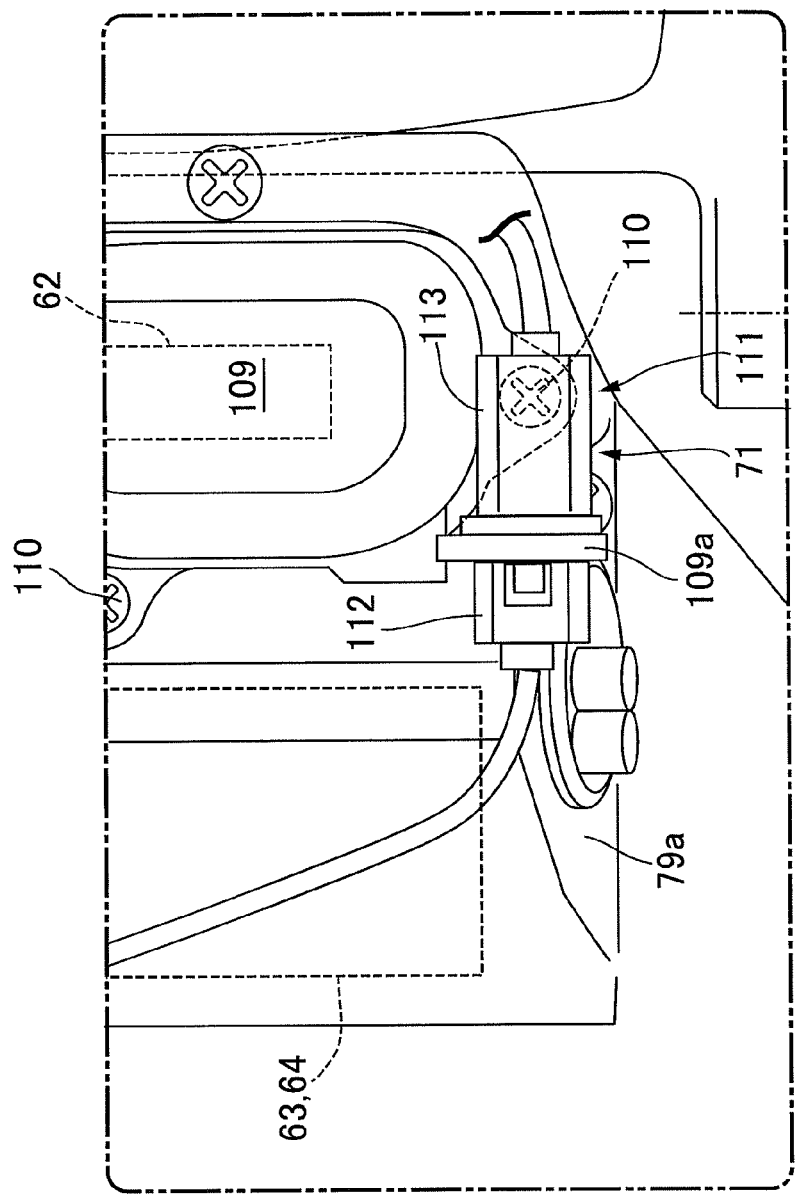
FIG. 10 is an enlarged view of a part indicated by an arrow 10 in FIG. 9. (Embodiment 1)
Figure 11:
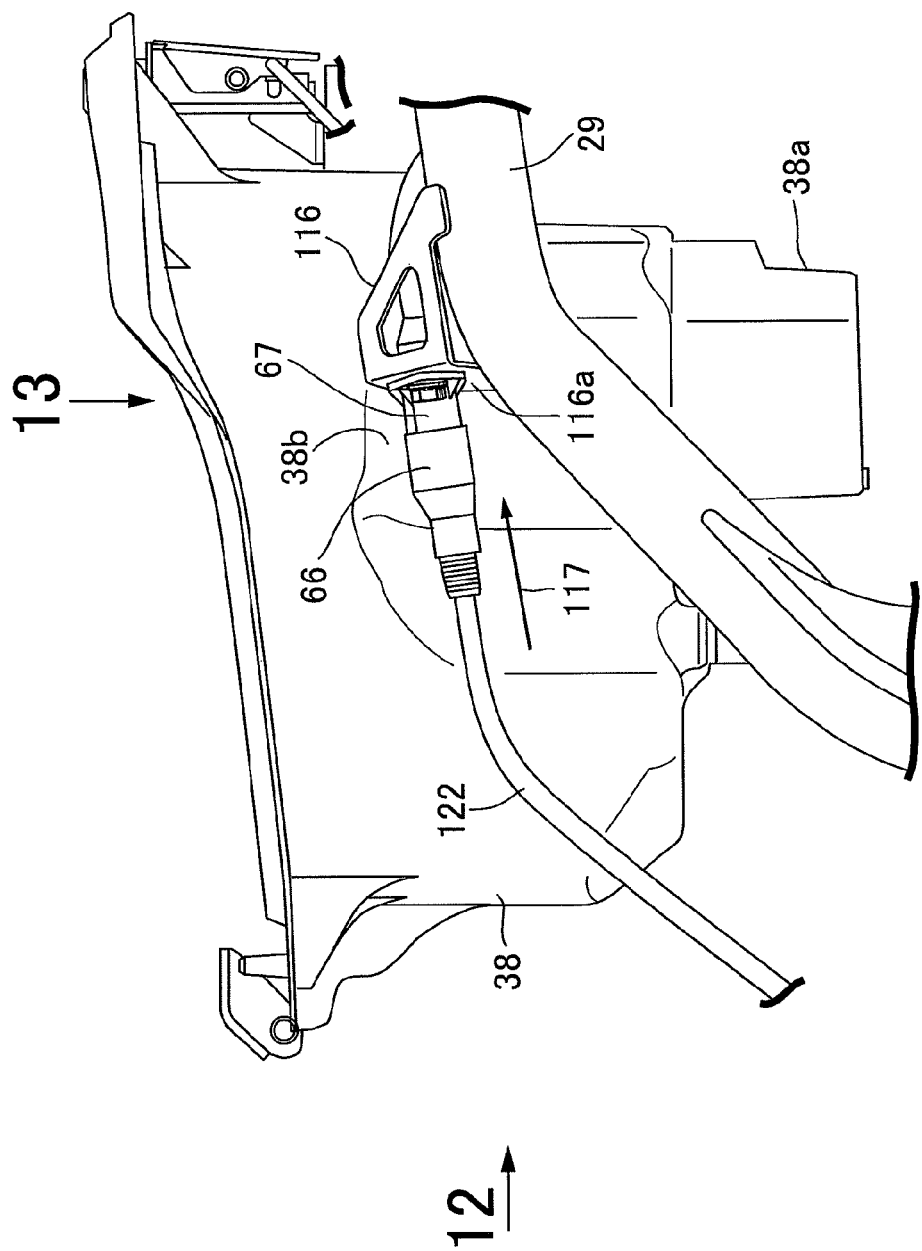
FIG. 11 is an enlarged view of an essential part in FIG. 2. (Embodiment 1)
Figure 12:
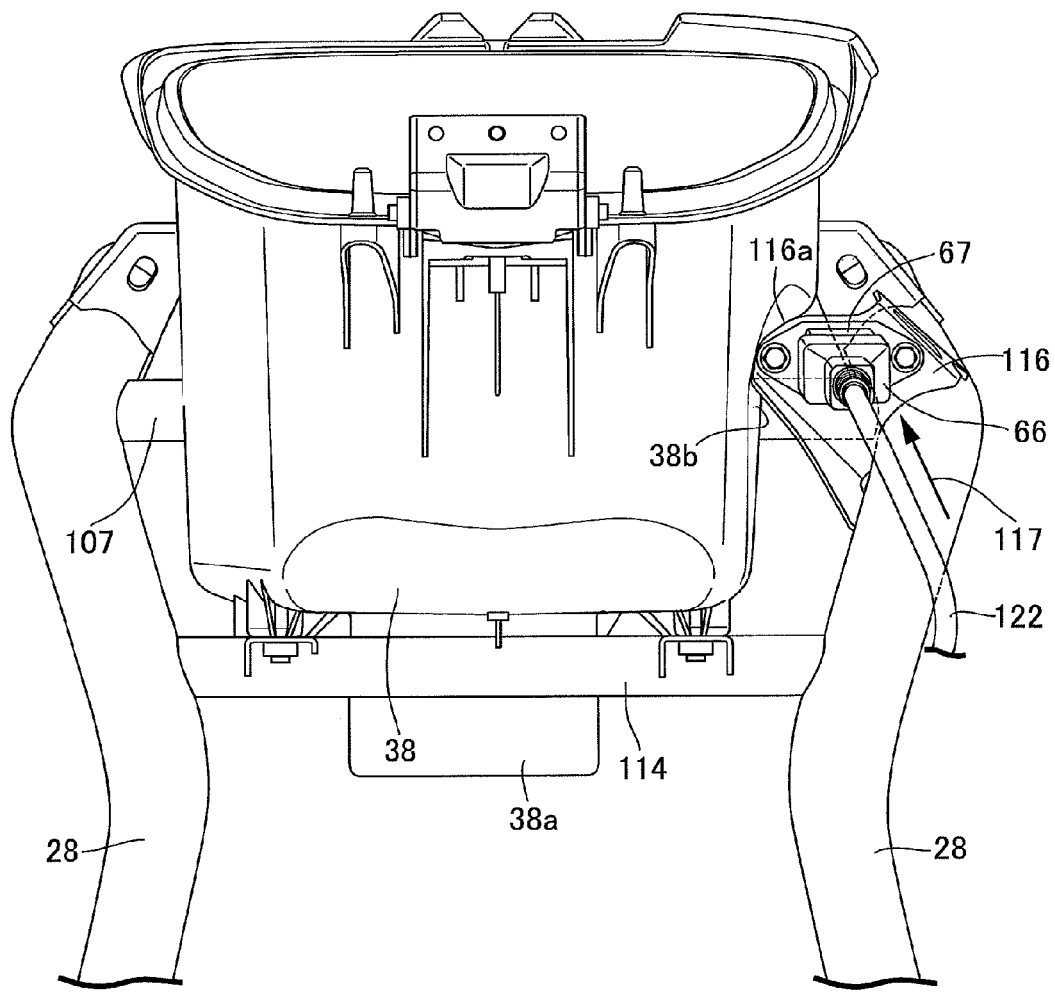
FIG. 12 is a view from a direction of an arrow 12 in FIG. 11. (Embodiment 1)
Figure 13:
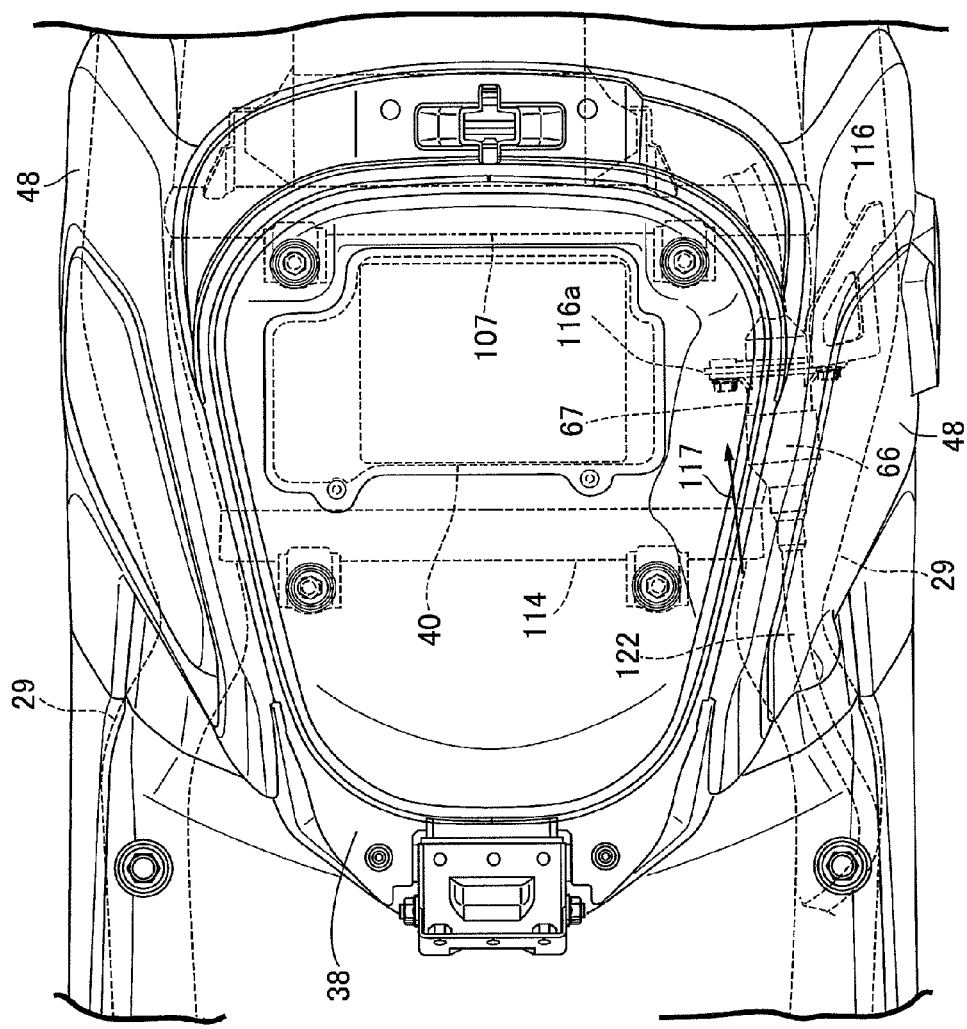
FIG. 13 is a view from a direction of an arrow 13 in FIG. 11. (Embodiment 1)
Figure 14:
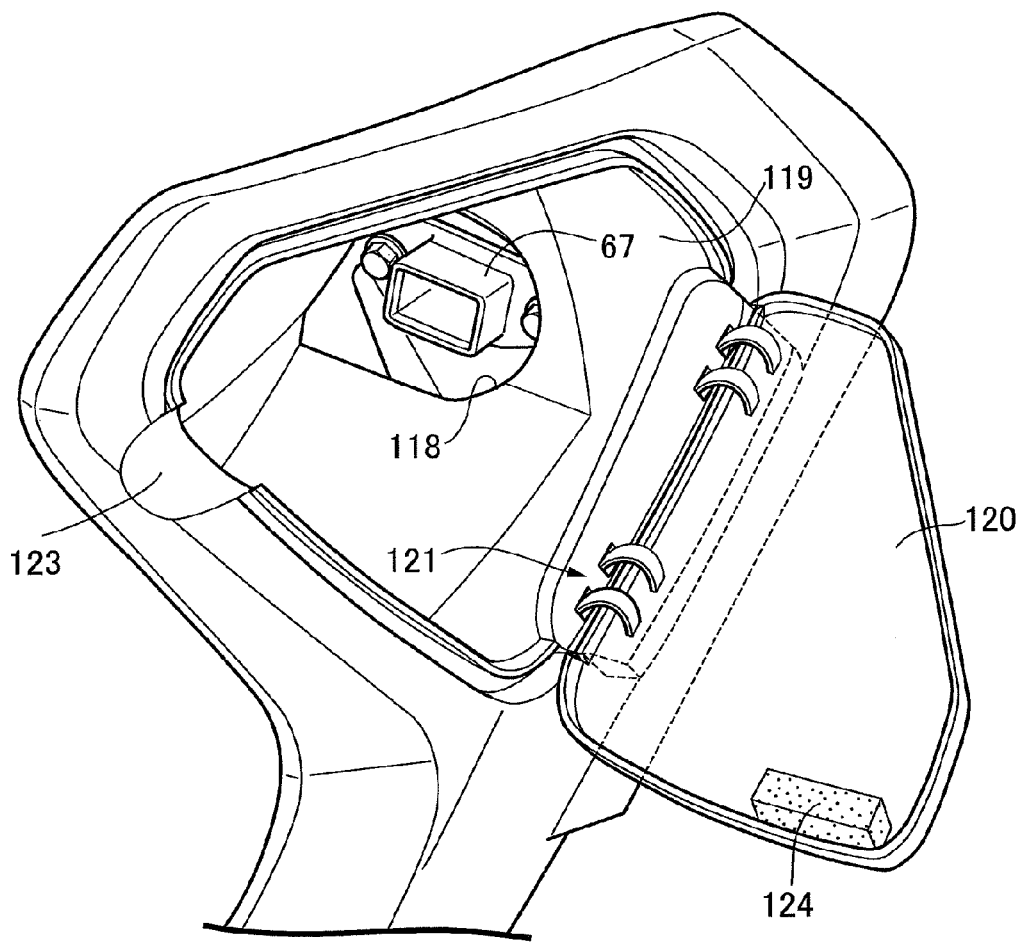
FIG. 14 is a side view showing a state in which an opening provided in a side cover is opened. (Embodiment 1)

In FIG. 10, the connector 71 is made up of a pair of connector half bodies 112 and 113 which are separable from each other. One 112 of the connector half bodies 112 and 113 is inserted through a retaining portion 109a, which is provided to the lid member 109, so as to be retained, and the connector half body 113 coupled with the connector half body 112 is arranged above one of the multiple screw members 110 . . . with which the lid member 109 is bound to the rising portion 79a of the upper case 79.

In FIG. 11 to FIG. 14, the storage box 38 is supported to the cross member 107, which is provided over between the rear frames 29 . . . , and the cross member 114, which is provided frontward of the cross member 107 between the rear frames 29 . . . . At the side of the storage box 38 in the side where the side stand 31 is arranged in the vehicle width direction, the receiver-side connector 67, into which the feeder-side connector 66 continuing to the charger 65 can be inserted for connection, is arranged. Then, a stay 116, which has an attachment portion 116a extending inwardly from the rear frame 29 . . . , is fixed to the left rear frame 29 of the pair of left and right rear frames 29 . . . , which form a part of the body frame F and are arranged at respective sides of the storage box 38, and then the receiver-side connector 67 is attached to the attachment portion 116a.

In addition, an insertion-connection direction 117 of the feeder-side connector 66 into the receiver-side connector 67 is set to have an inclination in such a manner as to be directed to a more inward position in the vehicle width direction at a position closer to the receiver-side connector 67 from the front or rear thereof. In Embodiment 1, the insertion-connection direction 117 of the feeder-side connector 66 which can be inserted into the receiver-side connector 67 for connection from the forward thereof is set to have an inclination in such a manner as to be directed to a more inward position in the vehicle width direction at a position closer to the receiver-side connector 67 from the front thereof. This insertion-connection direction 117 is a direction of a force maintaining the main stand 34 to be in the standing position side, that is, an outward direction, the force being applied to a turn supporting point of the main stand 34, which turns forward from a stored position thereof to be in a standing position, when the feeder-side connector 66 is inserted into the receiver-side connector 67 for connection.

A side cover 48 located at the left side of the storage box 38 is provided with an opening 118 which allows the receiver-side connector 67 to be exposed. This opening 118 is provided to a depressed portion 119, which is formed in the side cover 48 in such a manner as to be depressed inwardly from an outer surface of the side cover 48.

Further, the opening 118 and the depressed portion 119 are covered by a lid member 120, which is attached to the side cover 48 in such a manner as to be openable and closable. The lid member 120 is supported to the side cover 120 with a hinge mechanism 121 therebetween in such a manner as to be in an open position when operated rearwardly in the front and rear direction of the vehicle. A rotary axis CL (refer to FIG. 1) of the lid member 120 is set to have a rearward and upward inclination.

Moreover, in a front portion of the depressed portion 119, an outlet groove 123 which guides a lead 122 to the outside through between the side cover 48 and the lid member 120, the lead 122 continuing to the feeder-side connector 66 when the lid member 120 is closed in the state where the feeder-side connector 66 is connected to the receiver-side connector 67. An elastic member 124 to be interposed between the lead 122 and the lid member 120 is stuck to an inner surface of the lid member 120.

Further, on a left outer wall surface of the storage box 38, a housing depressed portion 38b is formed in such a manner as to be depressed inwardly, the housing depressed portion 38b housing and arranging at least a part (a part in Embodiment 1) of the receiver-side connector 67.

Next, the operation of Embodiment 1 will be described. The high-voltage battery 36, which supplies high-voltage electric power to the electric motor 23 exerting power to drive the rear wheel WR, is housed in the battery case 37, and cooling air is introduced into the battery case 37 through the cooling air inlet ducts 88 . . . by the action of the cooling fan 105. The openings 90 . . . which are open rearwardly of the vehicle are provided to the leg shield 43, and the respective upstream ends of the cooling air inlet ducts 88 . . . are connected to the leg shield 43 in such a manner as to continue to the respective openings 90. Accordingly, relatively clean air can be guided into the battery case 37 more easily, and thereby dust and the like are less likely to be accumulated in the air passage; therefore, it is possible to prevent an increase in the air passage resistance with long-term use.

Further, the depressed portion 91 is formed in the leg shield 43 in such a manner as to be depressed frontward from a rear surface thereof, the depressed portion 91 having at an upper portion thereof the openings 90 . . . . The air inlet opening 97 communicating with the openings 90 . . . is formed between a lower edge of the lid 94, which is attached to the leg shield 43 in such a manner as to cover the openings 90 . . . , and a lower portion of the depressed portion 91. Accordingly, rain water is less likely to enter the cooling air inlet duct 88 . . . through the openings 90 . . . ; therefore, it is possible to prevent an increase in the air passage resistance caused by adhesion of dust due to rain water onto the inner surface of the cooling air inlet ducts 88 . . . .

Further, the first projections 98 and 99, which extend long in the vehicle width direction and project rearward, are formed on the depressed portion 91 in such a manner as to project so as to form a space for air circulation between the depressed portion 91 and the lid 94, and the second projections 100 and 101, which extend long in the vehicle width direction and project forward, are formed on the inner surface of the lid 94 in such a manner as to project so as to form a space for air circulation between the lid 94 and the depressed portion 91. Accordingly, drainage of rain water with use of the first and second projections 98 and 99, and 100 and 101 is possible, and entry of rain water into the cooling air inlet ducts 88 . . . can be more effectively prevented. With the first projections 98 and 99 functioning as reinforcement ribs, the rigidity of the leg shield 43 can be improved. With the second projections 100 and 101 functioning as reinforcement ribs, the rigidity of the lid 94 can be improved. In addition, multiple pieces, for example, 2 pieces, each of the first and second projections 98 and 99, and 100 and 101 are arranged alternately in the up-and-down direction; therefore, it is possible further effectively prevent entry of rain water into the cooling air inlet ducts 88 . . . .

In addition, the spongy filtration member 104 is sandwiched between the leg shield 43 and the lid 94 so as to be interposed between the air inlet opening 97 and both of the openings 90 . . . . Accordingly, air guided into the battery case 37 is further purified; therefore, it is possible to more effectively prevent an increase in the air passage resistance with long-term use.

Further, the axle 102 of the front wheel WF is arranged frontward of the leg shield 43, and at least a part of the openings 90 . . . is arranged upwardly of the upper end of the front wheel WF as seen in a side view. Accordingly, the distance from the road surface to the openings 90 . . . is made relatively large; therefore, it is possible not to allow dust blown up from the road surface to easily enter the openings 90 . . . .

In the meantime, the battery case 37 is arranged between the pair of left and right under frames 28 . . . which extend rearwardly from the lower portion of the down frame 27 extending rearwardly and downwardly from the head pipe 26, and the cooling air inlet ducts 88 . . . are arranged in such a manner as to extend along the down frame 27 inside the leg shield 43. Accordingly, even in the structure in which the cooling air inlet ducts 88 . . . are housed inside the leg shield 43, the leg shield 43 can be made compact, and an increase in the size of the leg shield 43 can be prevented. Further, since the pair of left and right cooling air inlet duct 88 . . . are arranged in such a manner as to sandwich the down frame 27 from the both sides thereof, it is possible to avoid an increase in the sizes of the cooling air inlet ducts 88 . . . while securing a sufficient amount of cooling air introduced into the battery case 37.

Further, the cooling fan 105, which has the inlet side connected to the battery case 37 covered by the vehicle cover 41 and has the discharge opening 106 facing one side in the width direction of the battery case 37, is attached to the rear upper surface of the battery case 37 at a position offset to the other side from the center C of the battery case 37 in the width direction thereof. Accordingly, it is possible to reduce the air passage resistance due to rebound of the air discharged from the cooling fan 105 off the vehicle cover 41.

Further, the fuse 62 and the first and second relay switches 63 and 64 are inserted in the high-power circuit 74, which continues to the high-voltage battery 36, the first and second relay switches 63 and 64 being capable of switching off and on of the high-power circuit 74 with use of electric power supplied from the low-power circuit 75 connected to the lower-voltage battery 40, and capable of shutting the high-power circuit 74 when the low-power circuit 75 is shutoff. The connector 71 which is capable of switching by manual operation off and on of the low-power circuit 75 is inserted in the low-power circuit 75. Contact with the fuse 62 for a maintenance purpose is permitted only when the low-power circuit 75 is shutoff by the connector 71, with the action of the contact prevention means 111 which is formed so as to permit opening of the lid member 109 covering the fuse 62 housed between the rising portion 79a of the battery case 37 and the relay board 108 only in the state where the low-power circuit 75 is shutoff by the connector 71.

Accordingly, contact with the fuse 62 is only permitted in the state where the low-power circuit 75 is shutoff. In such a state, the first and second relay switches 63 and 64 are in a shutoff state and the high-power circuit 74 is shutoff. Accordingly, when the fuse 62 is subjected to maintenance, it is necessary to shut off the low-power circuit 75 by the connector 71. Therefore, the procedures in maintenance of the high-power fuse 62 can be more easily followed.

More over, the lid member 109 is bound to the rising portion 79a of the upper case 79 in the battery case 37, which houses the high-voltage battery 36, with the multiple screw members 110 .... The connector 71 is arranged in a position facing an opening side of the lid member 109 so as to permit opening of the lid member 109 in manual shutoff thereof. The contact prevention means 111 is formed in such a manner as to cover at least one of the multiple screw members 110 ... from the opening side of the lid member 109 while allowing the connector 71 to switch by manual operation conducting and shutting-off of a wire forming a part of the low-power circuit 75. Accordingly, by permitting opening of the lid member 109 in manual shutoff by the connector 71, the contact prevention means 111 can be formed in a simple structure.

Further, the fuse 62 and the lid member 109 are arranged at positions offset to one side from the center of the battery case 37 in the width direction thereof in a plan view. Accordingly, maintenance work from the one side of the vehicle body B in the width direction thereof can be easily carried out.

Further, the high-voltage battery 36 is arranged between the pair of left and right under frames 28 ... , and the low-voltage battery 40 is arranged between the pair of left and right rear frames 29 .... Accordingly, the high-voltage battery 36 and the low-voltage battery 40 can be protected from the outside. The first and second relay switches 63 and 64 are arranged between the high-voltage battery 36 and the low-voltage battery 40 as seen in a side view. Accordingly, the relay wiring can be made compact.

Further, the front portion of the swing arm 22 is supported in a swingable manner to the pivot plates 30 ... which are provided in respective front portions of both of the rear frames 29 ... in the body frame F. The electric motor 23 and the power drive unit 61, which is arranged frontward of the rear wheel WR so as to drive the electric motor 23, are provided to the swing arm 22. The first and second relay switches 63 and 64 are arranged as seen in a side view in the region surrounded by the high-voltage battery 36, the low-voltage battery 40, and the power drive unit 61. Accordingly, with the high-voltage electrical members arranged around the first and second relay switches 63 and 64, the high-voltage wiring can be made compact.

In the meantime, the storage box 38 is arranged below the riding seat 39 on which a rider sits. The opening 118, which is covered by the openable and closable lid member 120, is provided to the side cover 48 covering the storage box 38 below the riding seat 39. The receiver-side connector 67, into which the feeder-side connector 66 connected to the charger 65 can be inserted for connection, is fixed and arranged between the side cover 48 and the storage box 38 in such a manner as to face the opening 118. Accordingly, charging operation can be performed while the riding seat 39 is left in a closed state without the need of performing the opening and closing operation of the riding seat 39 which covers the storage box 38 from above. Accordingly, the charging operation becomes easy; thus, convenience is enhanced.

In addition, the insertion-connection direction 117 of the feeder-side connector 66 into the receiver-side connector 67 is set to have an inclination in such a manner as to be directed to a more inward position in the vehicle width direction at a position closer to the receiver-side connector 67 from the front or rear thereof. Accordingly, even if the receiver-side connector 67 is arranged between the side cover 48 and the storage box 38, a sufficient volume of the storage box 38 can be secured. Furthermore, the main stand 34 is supported to the swing arm 22 in a rotatable manner, the main stand 34 turning forward from the stored position thereof to be in a standing position. The insertion-connection direction 117 of the feeder-side connector 66 which can be inserted into the receiver-side connector 67 for connection is set to have an inclination in such a manner as to be directed to a more inward position in the vehicle width direction at a position closer to the receiver-side connector 67 from the front thereof. Accordingly, when the feeder-side connector 66 is inserted into the receiver-side connector 67 for connection, a force applied to the turn supporting point of the main stand 34 has a direction of maintaining the main stand 34 to be in the standing position side. Therefore, it will not happen that the main stand 34 turns undesirably to the stored position in response to insertion connection of the feeder-side connector 66 into the receiver-side connector 67.

Further, the lid member 120 is supported to the side cover 48 in such a manner as to be in an open position when operated rearwardly in the front and rear direction of the vehicle, and the rotary axis CL of the lid member 120 is set to have a rearward and upward inclination. Accordingly, the lid member 120 comes to be in the open position when operated rearwardly around the rotary axis CL having a rearward and upward inclination, and the lid member 120 in an open state has a rearward and downward inclined posture. Accordingly, it can be avoided as much as possible that the lid member 120 turns undesirably towards a closing side thereof by the action of wind or the like at the time of charging with the lid member 120 open.

Further, the depressed portion 119 which is depressed inwardly from the outer surface of the side cover 48 is formed in the side cover 48 in such a manner as to be capable of being closed by the lid member 120, and the opening 118 is provided in the depressed portion 119. Accordingly, it is possible to improve the strength of the side cover 48 with a portion forming the depressed portion 119 functioning as a reinforcement rib. In addition, the inward, except for the opening 118, of the side cover 48 is covered by the depressed portion 119. This can make it easy to find the receiver-side connector 67, and can make less likely to drop small articles into the inward of the side cover 48 when the depressed portion 119 is open.

Further, the housing depressed portion 38b which stores and arranges at least a part of the receiver-side connector 67 is formed on the left side wall outer surface of the storage box 38 in such a manner as to be depressed inwardly. Accordingly, a reduction in the volume of the storage box 38 due to the arrangement of the receiver-side connector 67 between the side cover 48 and the storage box 38 can be suppressed to be small by allowing only a necessary portion of the side walls of the storage box 38 to be depressed.

Further, the stay 116, which has the attachment portion 116a extending inwardly from the rear frame 29, is fixed to the rear frame 29, which forms a part of the body frame F and is arranged at a side of the storage box 38, and the receiver-side connector 67 is attached to the attachment portion 116a. Accordingly, it can be made easy that the side cover 48 is attached to the rear frames 29 ... while making sure that the receiver-side connector 67 would not stick outwardly from the rear frame 29.

Further, at the side where the side stand 31, which maintains the vehicle body B to be in a standing state with an inclination in the vehicle width direction thereof, is arranged, the receiver-side connector 67 and the opening 118 are arranged lateral to the storage box 38. Accordingly, charging operability in a parked state with the side stand 31 standing is improved.

Further, the receiver-side connector 67, to which the feeder-side connector 66 continuing to the external power supply PS with the charger 65 therebetween can be connected, is connected to the high-voltage battery 36 and the low-voltage battery 40 with the DC-DC converter 68 therebetween, the DC-DC converter 68 being arranged rearward of the storage box 38. Accordingly, a reverse current from the batteries 36 and 40 into the receiver-side connector 67 is unlikely to occur.

Embodiment 2

Figure 15:
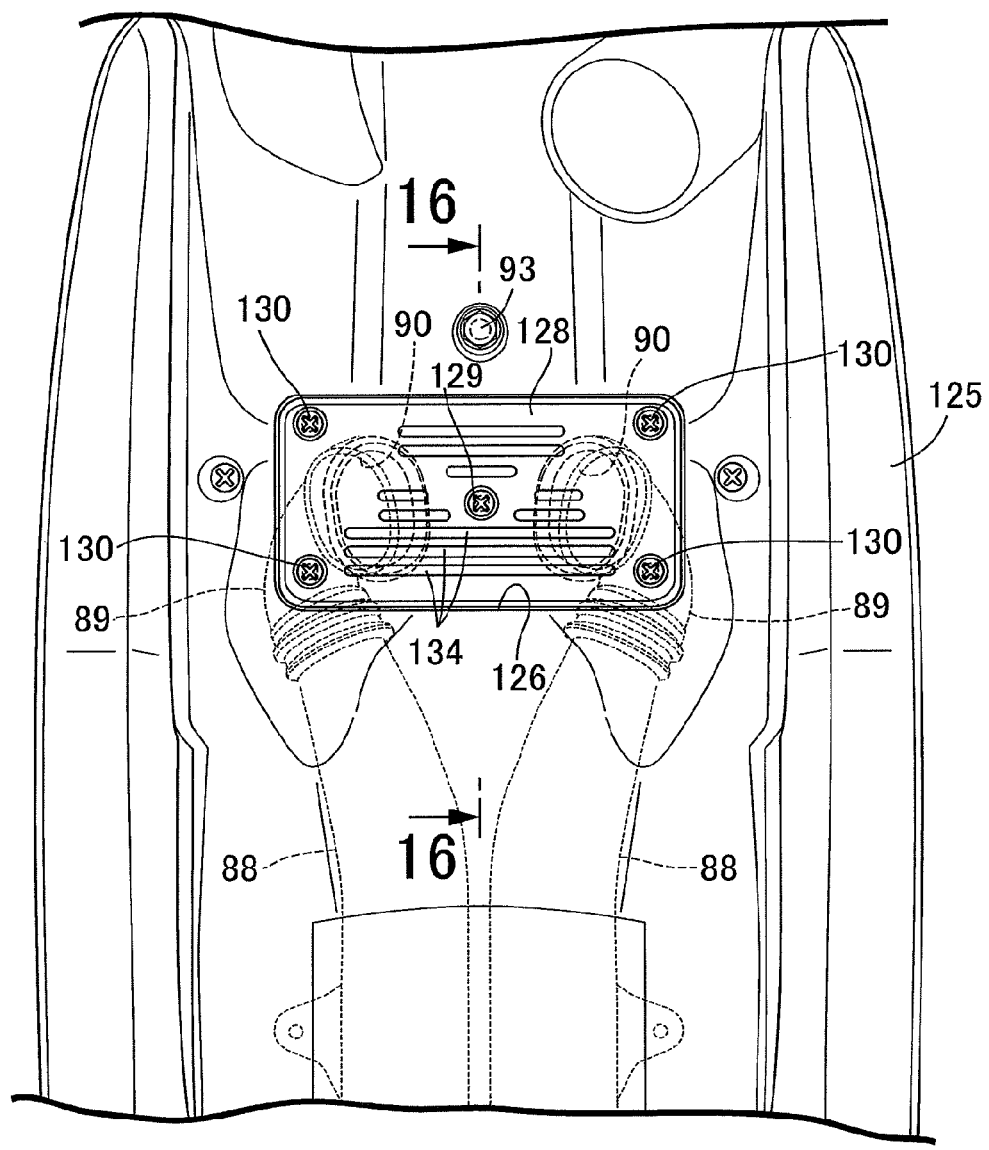
FIG. 15 is a rear view showing Embodiment 2 and a leg shield seen from rear. (Embodiment 2)
Figure 16:
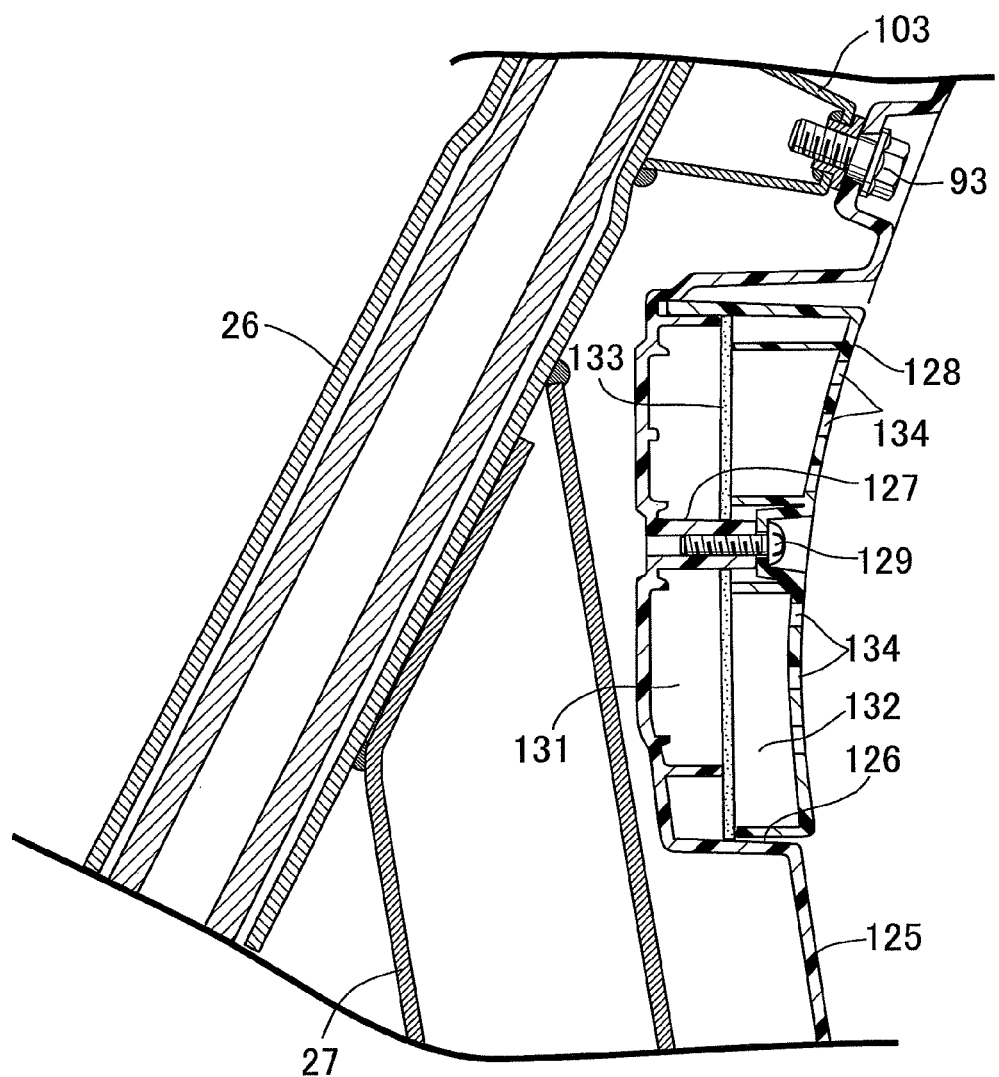
FIG. 16 is a sectional view taken along a line 16-16 in FIG. 15. (Embodiment 2)

Embodiment 2 of the present invention will be described by referring to FIG. 15 and FIG. 16. Parts corresponding to those in Embodiment 1 described above will be denoted by the same reference numerals, and be only included in the drawings as their description will be omitted.

Respective upstream end portions of a pair of left and right cooling air inlet ducts 88 and 88 which have respective downstream end portions connected to a battery case 37 (refer to Embodiment 1) are connected to a leg shield 125 with connecting pipes 89 . . . therebetween in such a manner as to continue to respective pair of left and right openings 90, 90 which are disposed in the leg shield 125 so as to be open toward rear of the vehicle.

In the meantime, a depressed portion 126 is formed in the leg shield 125 in such a manner as to be depressed forward from the rear surface thereof, and both of the openings 90 . . . are open at a closed portion at a front end of the depressed portion 126. In addition, a boss 127 is integrally formed in a rearwardly projecting manner on the depressed portion 126 at a middle portion between the openings 90 . . . .

Further, a lid 128 which covers both of the openings 90 . . . and the depressed portion 126 is to be brought into contact with the boss 127, and a screw member 129 which is inserted into the lid 128 is screwed with the boss 127. Further, an outer peripheral portion of the lid 128 is bound to the leg shield 125 with multiple screw members 130, 130 . . . .

Between the lid 128 and the leg shield 125, a filtration member 133 is sandwiched, the filtration member 133 forming a purified-air room 131 communicating with the openings 90 . . . between the filtration member 133 and the leg shield 125 and forming an unpurified-air room 132 between the filtration member 133 and the lid 128. The positioning of the filtration member 133 is achieved by penetration of the boss 127 thereinto. Further, multiple inlet openings 134, 134 . . . are provided to the lid 128.

According to Embodiment 2, air introduced into the unpurified-air room 132 through the inlet openings 134, 134 . . . , which are provided to the lid 128, is purified as passing through the filtration member 133, and thus purified air is introduced from the purified-air room 131 into the battery case 37 through the openings 90 . . . and the cooling air inlet ducts 88 . . . . Accordingly, dust and the like are less likely to accumulate in the air passage. Thus, it is possible to more effectively prevent an increase in the air passage resistance with long-term use.

Hereinabove, embodiments of the present invention have been described. The present invention is not limited to the above-described embodiments, and various design modifications are possible without departing from the gist of the present invention.

For example, although the case where the present invention is applied to an electric two-wheeled vehicle has been described in the above-described embodiments, the present invention is applicable to an electric three-wheeled vehicle as well.

The invention claimed is:

1. An electric two/three-wheeled vehicle including: an electric motor (23) which exerts power for driving a driven wheel (WR); a battery (36) which supplies electric power to the electric motor (23); a battery case (37) which houses the battery (36); a leg shield (43, 125) which covers, from a front, legs of a rider sitting on a riding seat (39); a cooling air inlet duct (88) which has a downstream end portion thereof connected to the battery case (39); and a cooling fan (105) which introduces cooling air into the battery case (37) through the cooling air inlet duct (88), characterized in that an opening (90) that is open toward a rear of the vehicle is provided in the leg shield (43, 125), an upstream end of the cooling air inlet duct (88) is connected to the leg shield (43, 125) in such a manner as to continue to the opening (90), a depressed portion (91) is formed in the leg shield (43) in such a manner as to be depressed frontward from a rear surface thereof, and has the opening (90) provided in an upper portion thereof, and an air inlet opening (97) which communicates with the opening (90) is formed between a lower portion of the depressed portion (91) and a lower edge of a lid (94) attached to the leg shield (43) to cover the opening (90).

2. The electric two/three-wheeled vehicle according to claim 1, wherein a first projection (98, 99) which extends long in a vehicle width direction and projects rearwardly is formed in the depressed portion (91) in such a projecting manner as to form a space for air circulation between the depressed portion (91) and the lid (94).

3. The electric two/three-wheeled vehicle according to claim 2, wherein a second projection (100, 101) which extends long in the vehicle width direction and projects frontwardly is formed on an inner surface of the lid (94) in such a projecting manner as to form a space for air circulation between the lid (94) and the depressed portion (91).

4. The electric two/three-wheeled vehicle according to claim 3, wherein respective pluralities of the first and second projections (98, 99; 100,101) are arranged alternately in an up-and-down direction.

5. The electric two/three-wheeled vehicle according to claim 4, wherein an axle (102) of a front wheel (WF) is arranged forward of the leg shield (43, 125), and at least a part of the opening (90) is arranged above an upper end of the front wheel (WF) as seen in a side view.

6. The electric two/three-wheeled vehicle according to claim 4, further comprising: a down frame (27) extending rearwardly and downwardly from a head pipe (26) which supports in a steerable manner a front fork (24) pivotally supporting the front wheel (WF); a pair of left and right under frames (28) extending rearwardly from a lower portion of the down frame (27); and a pair of left and right rear frames (29) extending rearwardly and upwardly from a rear portion of the under frames (28), wherein the battery case (37) is arranged between the pair of left and right under frames (28), and the cooling air inlet duct (88) is arranged in the leg shield (43, 125) in such a manner as to extend along the down frame (27).

7. The electric two/three-wheeled vehicle according to claim 3, wherein an axle (102) of a front wheel (WF) is arranged forward of the leg shield (43, 125), and at least a part of the opening (90) is arranged above an upper end of the front wheel (WF) as seen in a side view.

8. The electric two/three-wheeled vehicle according to claim 3, further comprising: a down frame (27) extending rearwardly and downwardly from a head pipe (26) which supports in a steerable manner a front fork (24) pivotally supporting the front wheel (WF); a pair of left and right under frames (28) extending rearwardly from a lower portion of the down frame (27); and a pair of left and right rear frames (29) extending rearwardly and upwardly from a rear portion of the under frames (28), wherein the battery case (37) is arranged between the pair of left and right under frames (28), and the cooling air inlet duct (88) is arranged in the leg shield (43, 125) in such a manner as to extend along the down frame (27).

9. The electric two/three-wheeled vehicle according to claim 3, wherein the cooling fan (105) whose inlet side is connected to the battery case (37) covered with a vehicle cover (41) and whose discharge opening (106) is open toward one side of the battery case (37) in a width direction, is attached to a rear upper surface of the battery case (37) at a position offset to the other side from a center of the battery case (37) in the width direction.

10. The electric two/three-wheeled vehicle according to claim 2, wherein an axle (102) of a front wheel (WF) is arranged forward of the leg shield (43, 125), and at least a part of the opening (90) is arranged above an upper end of the front wheel (WF) as seen in a side view.

11. The electric two/three-wheeled vehicle according to claim 2, further comprising: a down frame (27) extending rearwardly and downwardly from a head pipe (26) which supports in a steerable manner a front fork (24) pivotally supporting the front wheel (WF); a pair of left and right under frames (28) extending rearwardly from a lower portion of the down frame (27); and a pair of left and right rear frames (29) extending rearwardly and upwardly from a rear portion of the under frames (28), wherein the battery case (37) is arranged between the pair of left and right under frames (28), and the cooling air inlet duct (88) is arranged in the leg shield (43, 125) in such a manner as to extend along the down frame (27).

12. The electric two/three-wheeled vehicle according to claim 2, wherein the cooling fan (105) whose inlet side is connected to the battery case (37) covered with a vehicle cover (41) and whose discharge opening (106) is open toward one side of the battery case (37) in a width direction, is attached to a rear upper surface of the battery case (37) at a position offset to the other side from a center of the battery case (37) in the width direction.

13. The electric two/three-wheeled vehicle according to claim 1, wherein an axle (102) of a front wheel (WF) is arranged forward of the leg shield (43, 125), and at least a part of the opening (90) is arranged above an upper end of the front wheel (WF) as seen in a side view.

14. The electric two/three-wheeled vehicle according to claim 1, further comprising: a down frame (27) extending rearwardly and downwardly from a head pipe (26) which supports in a steerable manner a front fork (24) pivotally supporting the front wheel (WF); a pair of left and right under frames (28) extending rearwardly from a lower portion of the down frame (27); and a pair of left and right rear frames (29) extending rearwardly and upwardly from a rear portion of the under frames (28), wherein the battery case (37) is arranged between the pair of left and right under frames (28), and the cooling air inlet duct (88) is arranged in the leg shield (43, 125) in such a manner as to extend along the down frame (27).

15. The electric two/three-wheeled vehicle according to claim 14, wherein a pair of left and right cooling air inlet ducts (88) are arranged in such a manner as to sandwich the down frame (27) from opposite sides thereof.

16. The electric two/three-wheeled vehicle according to claim 1, wherein the cooling fan (105) whose inlet side is connected to the battery case (37) covered with a vehicle cover (41) and whose discharge opening (106) is open toward one side of the battery case (37) in a width direction, is attached to a rear upper surface of the battery case (37) at a position offset to the other side from a center of the battery case (37) in the width direction.

17. An electric two/three-wheeled vehicle including: an electric motor (23) which exerts power for driving a driven wheel (WR); a battery (36) which supplies electric power to the electric motor (23); a battery case (37) which houses the battery (36); a leg shield (43, 125) which covers, from a front, legs of a rider sitting on a riding seat (39); a cooling air inlet duct (88) which has a downstream end portion thereof connected to the battery case (39); and a cooling fan (105) which introduces cooling air into the battery case (37) through the cooling air inlet duct (88), characterized in that an opening (90) that is open toward a rear of the vehicle is provided in the leg shield (43, 125), an upstream end of the cooling air inlet duct (88) is connected to the leg shield (43, 125) in such a manner as to continue to the opening (90), a filtration member (133) is held between the leg shield (125) and a lid (128) attached to the leg shield (125), the filtration member (133) forming a purified-air room (131) communicating with the opening (90) between the filtration member (133) and the leg shield (125) and forming an unpurified-air room (132) between the filtration member (133) and the lid (128), and a plurality of inlet openings (134) are provided to the lid (128).

18. The electric two/three-wheeled vehicle according to claim 17, wherein an axle (102) of a front wheel (WF) is arranged forward of the leg shield (43, 125), and at least a part of the opening (90) is arranged above an upper end of the front wheel (WF) as seen in a side view.

19. The electric two/three-wheeled vehicle according to claim 17, further comprising: a down frame (27) extending rearwardly and downwardly from a head pipe (26) which supports in a steerable manner a front fork (24) pivotally supporting the front wheel (WF); a pair of left and right under frames (28) extending rearwardly from a lower portion of the down frame (27); and a pair of left and right rear frames (29) extending rearwardly and upwardly from a rear portion of the under frames (28), wherein the battery case (37) is arranged between the pair of left and right under frames (28), and the cooling air inlet duct (88) is arranged in the leg shield (43, 125) in such a manner as to extend along the down frame (27).

20. An electric two/three-wheeled vehicle including: an electric motor (23) which exerts power for driving a driven wheel (WR); a battery (36) which supplies electric power to the electric motor (23); a battery case (37) which houses the battery (36); a leg shield (43, 125) which covers, from a front, legs of a rider sitting on a riding seat (39); a cooling air inlet duct (88) which has a downstream end portion thereof connected to the battery case (39); and a cooling fan (105) which introduces cooling air into the battery case (37) through the cooling air inlet duct (88), characterized in that an opening (90) that is open toward a rear of the vehicle is provided in the leg shield (43, 125), an upstream end of the cooling air inlet duct (88) is connected to the leg shield (43, 125) in such a manner as to continue to the opening (90), and the cooling fan (105) whose inlet side is connected to the battery case (37) covered with a vehicle cover (41) and whose discharge opening (106) is open toward one side of the battery case (37) in a width direction, is attached to a rear upper surface of the battery case (37) at a position offset to the other side from a center of the battery case (37) in the width direction.

* * * * *